US008907883B2

(12) United States Patent
Irie et al.

(10) Patent No.: US 8,907,883 B2
(45) Date of Patent: Dec. 9, 2014

(54) ACTIVE MATRIX TYPE LIQUID CRYSTAL DISPLAY DEVICE AND DRIVE METHOD THEREOF

(75) Inventors: Kentaro Irie, Tsu (JP); Masae Kitayama, Tsu (JP); Fumikazu Shimoshikiryoh, Matsusaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 1460 days.

(21) Appl. No.: 12/224,956

(22) PCT Filed: Mar. 15, 2007

(86) PCT No.: PCT/JP2007/055239
§ 371 (c)(1),
(2), (4) Date: Sep. 10, 2008

(87) PCT Pub. No.: WO2007/135803
PCT Pub. Date: Nov. 29, 2007

(65) Prior Publication Data
US 2009/0051641 A1    Feb. 26, 2009

(30) Foreign Application Priority Data

May 19, 2006  (JP) .................................. 2006-140921

(51) Int. Cl.
G09G 3/36       (2006.01)
G02F 1/1362     (2006.01)
G02F 1/1343     (2006.01)

(52) U.S. Cl.
CPC ........ G09G 3/3648 (2013.01); G02F 1/136213 (2013.01); G09G 2300/0876 (2013.01); G02F 2001/134345 (2013.01); G09G 2310/061 (2013.01)

USPC ........................................................... 345/96

(58) Field of Classification Search
USPC ............................................................ 345/96
See application file for complete search history.

(56) References Cited

U.S. PATENT DOCUMENTS 5,966,111 A * 10/1999 Koshoubu et al. .............. 345/94
6,396,469 B1    5/2002 Miwa et al.
2003/0227429 A1 12/2003 Shimoshikiryo
2005/0213015 A1  9/2005 Shimoshikiryo (Continued)

FOREIGN PATENT DOCUMENTS

EP    1 818 903     8/2007
JP    2005-345973   12/2005

(Continued)

Primary Examiner — Seokyun Moon
Assistant Examiner — Joseph Fox
(74) Attorney, Agent, or Firm — Harness, Dickey & Pierce, PLC

(57) ABSTRACT

An active matrix type liquid crystal display device may include a black signal insertion device to apply a voltage corresponding to a black display as a voltage for data signal lines only during a black signal insertion period that is a part of one frame period, a black insertion ratio change device to change the insertion period, and an unchanged-storage-capacitor-phase-keeping device to control the insertion period after the change. The control makes a time difference the same, before and after the change, between (i) a timing, among timings at which signal voltages of the first or second storage capacitor line rise, at which a storage capacitor voltage rises that is both prior to a start timing of the insertion period and a closest timing to the start timing of the insertion period, and (ii) the start timing of the insertion period.

11 Claims, 11 Drawing Sheets

(56) References Cited

U.S. PATENT DOCUMENTS

| | | |
|---|---|---|
| 2005/0259064 A1* | 11/2005 | Sugino et al. .................. 345/102 |
| 2005/0270282 A1 | 12/2005 | Kawaguchi |
| 2006/0256271 A1 | 11/2006 | Shimoshikiryo |
| 2008/0158203 A1 | 7/2008 | Irie et al. |

FOREIGN PATENT DOCUMENTS

| | | |
|---|---|---|
| JP | 2006-049245 | 2/2006 |
| WO | WO 2006-049245 | 5/2006 |
| WO | WO 2006/049245 | 5/2006 |

* cited by examiner (a) STORAGE CAPACITOR (CS) WAVEFORM (b) BLACK WRITING PULSE (5% BLACK WRITING PULSE)

(c) BLACK WRITING PULSE (10% BLACK WRITING PULSE)

(a)

(b)

| BLACK INSERTION RATIO | BLACK INSERTION PULSE OUTPUT TIMING |
|---|---|
| 30% | Vtotal-329 |
| 28% | Vtotal-309 |
| 26% | Vtotal-289 |
| 24% | Vtotal-269 |
| 22% | Vtotal-249 |
| 21% | Vtotal-229 |
| 19% | Vtotal-209 |
| 17% | Vtotal-189 |
| 15% | Vtotal-169 |
| 13% | Vtotal-149 |
| 12% | Vtotal-129 |
| 10% | Vtotal-109 |
| 8% | Vtotal-89 |
| 6% | Vtotal-69 |
| 4% | Vtotal-49 |
| 3% | Vtotal-29 |

(a)

(b)

(c)

(a) STORAGE CAPACITOR (CS) WAVEFORM (b) BLACK WRITING PULSE (5% BLACK WRITING PULSE)

(c) BLACK WRITING PULSE (10% BLACK WRITING PULSE)

ACTIVE MATRIX TYPE LIQUID CRYSTAL DISPLAY DEVICE AND DRIVE METHOD THEREOF

TECHNICAL FIELD

The present invention relates to an active matrix type liquid crystal display device including: scanning signal lines; data signal lines; a pixel at each intersection of the scanning signal lines and the data signal lines, which pixel is made of two sub-pixels; a first storage capacitor line forming a capacitor between the first storage capacitor line and a first sub-pixel electrode in one of the two sub-pixels; and a second storage capacitor line forming a capacitor between the second storage capacitor line and a second sub-pixel electrode in the other one of the two sub-pixels, to which first and second storage capacitor lines signal voltages of phases opposite to each other are applied, respectively, and a drive method of the active matrix type liquid crystal display device.

BACKGROUND ART

In an impulse type display device such as a CRT (Cathode Ray Tube), as for individual pixels, each individual pixel repeats alternately a lightening period in which an image is displayed and a non-lighting period in which an image is not displayed. For example, in a case where a moving image is displayed, an afterimage of a moving object does not occur to human eyes because the non-lighting period is inserted at the time when an image of one screen is rewritten.

On the other hand, in a hold type display device that employs TFTs (Thin Film Transistors), a luminance of each individual pixel depends on a voltage that is held by each corresponding pixel capacitor. The voltage that is held by the pixel capacitor is kept for one frame period, once rewritten. In the hold type display device, a blurring phenomenon (moving image blur) occurs when a moving image is displayed. This moving image blur is caused by pursuit of a displayed moving body with eyes (eye pursuit).

Accordingly, in a hold type display device such as an active matrix type liquid crystal display device, a moving image blur occurs at the time of a moving image display. On this account, a technique for improving this moving image blur is proposed.

For example, Patent Document 1 discloses, as a method of improving a trailing afterimage mentioned above, a method of converting a display of the liquid crystal display device into a (pseudo-)impulse display by insertion of a period in which a black display is performed (hereinafter, referred to as "black insertion") in one frame period.

According to Patent Document 1, as illustrated in FIG. 11, for example, in the case of a liquid crystal display panel that includes 480 scanning lines (gate lines), the gate lines Y1 through Y480 are sequentially activated, according to respective timings that are slightly shifted one another, for writing image signals into respective pixel cells during one frame period. The one frame period is completed, when all of the 480 gate lines are activated and an image signal is written into each pixel cell. In this operation, after approximately ½ frame period from the activation for writing the image signal, the gate lines Y1 through Y480 are activated again so that an electric potential for displaying black is supplied to each pixel cell via a data line X. This causes the each pixel cell to be in a black display state.

That is, each gate Y becomes high level twice in different times of one frame period. In response to first selection of the gate line Y, the each pixel cell displays image data for a predetermined period. In response to subsequent second selection of the gate line Y, the each pixel cell is forced to perform a black display. In this way, an image display period and a black display period are provided in one frame period. This allows a hold type drive display state to approach a pseudo impulse type drive display as in a CRT. This makes it possible to improve image quality deterioration caused by motion blur that occurs at the time of a moving image display.

Although contrast is excellent in a vertical alignment mode (VA mode), a gamma curve at the front does not agree with a gamma curve at an oblique viewing angle. Accordingly, a whole screen looks white (excessively bright) when viewed at an oblique viewing angle, compared with a case where the screen is viewed at the front. As a technique for reducing the excess brightness at the oblique viewing angle, for example, Patent Document 3 splits one picture element into a plurality of sub-picture elements (multi-picture element structure) and sets respective luminances of the sub-picture elements so that the luminances differ from each other (this technique is called a multi-picture element technique or an area coverage modulation technique).

[Patent Document 1]
Japanese Unexamined Patent Publication No. 109921/1999 (Tokukaihei 11-109921 (published on Apr. 23, 1999))
[Patent Document 2]
Japanese Unexamined Patent Publication No. 345973/2005 (Tokukai 2005-345973 (published on Dec. 15, 2005))
[Patent Document 3]
Japanese Unexamined Patent Publication No. 62146/2004 (Tokukai 2004-62146 (published on Feb. 26, 2004))

DISCLOSURE OF INVENTION

Problems to be Solved by the Invention

However, a prototype was produced by a combination of a black insertion technique and a multi-picture element technique. As a result of evaluating the prototype, as illustrate in FIG. 12, it is found that a difference in luminance occurs between an upper side of a display panel screen and a lower side of the display panel screen.

The difference occurs because a state of a waveform of the storage capacitor CS as illustrated in FIG. 13(a) differs between a case where black insertion is carried out in a position as illustrated in FIG. 13(b) with respect to the waveform of the storage capacitor CS as illustrated in FIG. 13(a) and a case where black insertion is carried out in a position as illustrated in FIG. 13(c) with respect to the storage capacitor CS as illustrated in FIG. 13(a). As a result, a boosted amount and a depressed amount of the storage capacitor CS vary, respectively. This causes a difference in luminance between an upper side of the display panel screen and a lower side of the display panel screen, as illustrated in FIG. 12.

In particular, this problem tends to occur when a ratio of a black display period is changed. For example, Patent Document 2 discloses that a timing for writing black is changed by a black insertion ratio. However, Patent Document 2 does not teach anything about a problem such that a difference in luminance occurs between an upper side of the display panel screen and a lower side of the display panel screen.

The present invention is attained in view of the conventional problem mentioned above. An object of the present invention is to provide an active matrix type liquid crystal display device capable of preventing the occurrence of a difference in luminance between an upper side of the display panel screen and a lower side of the display panel screen in a case where black insertion is carried out with respect to a display panel which forms bright and dark sub-pixels by changing, for every sub-pixel, an effective voltage to each pixel with the use of capacitive coupling of a storage capacitor and a liquid crystal capacitor, and a drive method thereof.

Means to Solve the Problems

In order to solve the problem mentioned above, an active matrix type liquid crystal display device of the present invention including: scanning signal lines; data signal lines; a pixel at each intersection of the scanning signal lines and the data signal lines, the pixel being composed of a plurality of sub-pixels; a first storage capacitor line forming a capacitor between the first storage capacitor line and a first sub-pixel electrode in at least one of the plurality of sub-pixels; and a second storage capacitor line forming a capacitor between the second storage capacitor line and a second sub-pixel electrode in at least another one of the plurality of sub-pixels, to which first storage capacitor line and second storage capacitor line signal voltages of phases opposite to each other are periodically applied, respectively, the active matrix type liquid crystal display device includes: black signal insertion means applying a voltage corresponding to a black display as a voltage for each of the data signal lines, only in a black signal insertion period that is a part of one frame period; black insertion ratio change means changing the black signal insertion period; and unchanged-storage-capacitor-phase keeping means controlling the black signal insertion period after a change, so that a time difference between (i) a timing at which a storage capacitor voltage rises which timing is a timing that is a closest timing to a start timing of the black signal insertion period and that is prior to the start timing of the black signal insertion period, among timings at which signal voltages of the first storage capacitor line or the second storage capacitor line rise, respectively, and (ii) the start timing of the black signal insertion period becomes same before and after the change in the black signal insertion period.

In the above arrangement of the active matrix type liquid crystal display device of the present invention: the unchanged-storage-capacitor-phase keeping means controls the black signal insertion period after the change so that a time difference between (i) the timing at which the storage capacitor voltage rises and (ii) a timing at which a black insertion pulse rises, the black insertion pulse being applied first to each of the scanning signal lines in the black signal insertion period becomes same before and after the change in the black signal insertion period.

In order to solve the problem mentioned above, a drive method of an active matrix type liquid crystal display device of the present invention including: scanning signal lines; data signal lines; a pixel at each intersection of the scanning signal lines and the data signal lines, the pixel being composed of a plurality of sub-pixels; a first storage capacitor line forming a capacitor between the first storage capacitor line and a first sub-pixel electrode in at least one of the plurality of sub-pixels; and a second storage capacitor line forming a capacitor between the second storage capacitor line and a second sub-pixel electrode in at least another one of the plurality of sub-pixels, to which first storage capacitor line and second storage capacitor line signal voltages of phases opposite to each other are periodically applied, respectively, the drive method includes the steps of: inserting a black signal so as to apply a voltage corresponding to a black display as a voltage for each of the data signal lines, only in a black signal insertion period that is a part of one frame period; changing a black insertion ratio so as to change the black signal insertion period; and keeping an unchanged storage capacitor phase for controlling the black signal insertion period after a change that a time difference between (i) a timing at which a storage capacitor voltage rises which timing is a timing that is a closest timing to a start timing of the black signal insertion period and that is prior to the start timing of the black signal insertion period, among timings at which signal voltages of the first storage capacitor line or the second storage capacitor line rise, respectively, and (ii) the start timing of the black signal insertion period becomes same before and after the change in the black signal insertion period.

An active matrix type liquid crystal display device of the present invention including: scanning signal lines; data signal lines; a pixel at each intersection of the scanning signal lines and the data signal lines, the pixel being composed of a plurality of sub-pixels; a first storage capacitor line forming a capacitor between the first storage capacitor line and a first sub-pixel electrode in at least one of the plurality of sub-pixels; and a second storage capacitor line forming a capacitor between the second storage capacitor line and a second sub-pixel electrode in at least another one of the plurality of sub-pixels, to which first storage capacitor line and second storage capacitor line signal voltages of phases opposite to each other are applied, respectively, the active matrix type liquid crystal display device includes: black signal insertion means applying a voltage corresponding to a black display as a voltage for each of the data signal lines, only in a black signal insertion period that is a part of one frame period; black insertion ratio change means changing the black signal insertion period; and unchanged-storage-capacitor-phase keeping means controlling the black signal insertion period after a change, at the time when the black signal insertion period is changed, so that (i) a time from a position in which a signal voltage of the first storage capacitor line or the second storage capacitor line rises to a position in which a first black insertion pulse rises in the black signal insertion period before the change becomes equal to (ii) a time from a position in which a signal voltage of the first storage capacitor line or the second storage capacitor line rises to a position in which a first black insertion pulse rises in the black signal insertion period after the change.

A drive method of an active matrix type liquid crystal display device of the present invention including: scanning signal lines; data signal lines; a pixel at each intersection of the scanning signal lines and the data signal lines, the pixel being composed of a plurality of sub-pixels; a first storage capacitor line forming a capacitor between the first storage capacitor line and a first sub-pixel electrode in at least one of the plurality of sub-pixels; and a second storage capacitor line forming a capacitor between the second storage capacitor line and a second sub-pixel electrode in at least another one of the plurality of sub-pixels, to which first storage capacitor line and second storage capacitor line signal voltages of phases opposite to each other are applied, respectively, the drive method includes the steps of: inserting a black signal so as to apply a voltage corresponding to a black display as a voltage for each of the data signal lines, only in a black signal insertion period that is a part of one frame period; changing a black insertion ratio so as to change the black signal insertion period; and keeping an unchanged storage capacitor phase so as to control the black signal insertion period after a change, at the time when the black signal insertion period is changed, so that (i) a time from a position in which a signal voltage of the first storage capacitor line or the second storage capacitor line rises to a position in which a first black insertion pulse rises in the black signal insertion period before the change becomes equal to (ii) a time from a position in which a signal voltage of the first storage capacitor line or the second storage capacitor line rises to a position in which a first black insertion pulse rises in the black signal insertion period after the change.

The present invention is directed to an active matrix type liquid crystal display device including: scanning signal lines; data signal lines; a pixel at each intersection of the scanning signal lines and the data signal lines, the pixel being composed of a plurality of sub-pixels; a first storage capacitor line forming a capacitor between the first storage capacitor line and a first sub-pixel electrode in at least one of the plurality of sub-pixels; and a second storage capacitor line forming a capacitor between the second storage capacitor line and a second sub-pixel electrode in at least another one of the plurality of sub-pixels, to which first storage capacitor line and second storage capacitor line signal voltages of phases opposite to each other are applied, respectively.

Moreover, in the present invention, black insertion is performed for producing a pseudo-impulse display. Specifically, the black signal insertion means applies a voltage corresponding to a black display as a voltage for each data signal line, only in a black signal insertion period that is a part of one frame period. Further, the black insertion ratio change means changes the black signal insertion period.

In such an active matrix type liquid crystal display device, a luminance difference in the display section may occur in connection with a waveform of the storage capacitor voltage, due to the change in the black insertion ratio. This is because, when the black signal insertion period is changed, a time width from a position where a first black insertion pulse rises in the black signal insertion period before the change to a position where the signal voltage of the first or second storage capacitor line rises differs from a time width from a position where a first black insertion pulse rises in the black signal insertion period after the change to a position where the signal voltage of the first or second storage capacitor line rises.

Accordingly, in order to solve the problem mentioned above, in the present invention, unchanged-storage-capacitor-phase keeping means is provided for controlling the black signal insertion period after a change, at the time when the black signal insertion period is changed, so that (i) a time from a position in which a signal voltage of the first storage capacitor line or the second storage capacitor line rises to a position in which a first black insertion pulse rises in the black signal insertion period before the change becomes equal to (ii) a time from a position in which a signal voltage of the first storage capacitor line or the second storage capacitor line rises to a position in which a first black insertion pulse rises in the black signal insertion period after the change.

This makes it possible to provide an active matrix type liquid crystal display device capable of preventing the occurrence of a difference in luminance between an upper side of a display panel screen and a lower side of the display panel screen, in a case where black insertion is performed with respect to a display panel in which bright and dark sub-pixels are formed by changing, for every sub-pixel, an effective voltage to each pixel by capacitor coupling of the storage capacitor and the liquid crystal capacitor, and a drive method of the active matrix type liquid crystal display device.

In order to solve the problem mentioned above, an active matrix type liquid crystal display device of the present invention including: scanning signal lines; data signal lines; a pixel at each intersection of the scanning signal lines and the data signal lines, the pixel being composed of a plurality of sub-pixels; a first storage capacitor line forming a capacitor between the first storage capacitor line and a first sub-pixel electrode in at least one of the plurality of sub-pixels; and a second storage capacitor line forming a capacitor between the second storage capacitor line and a second sub-pixel electrode in at least another one of the plurality of sub-pixels, to which first storage capacitor line and second storage capacitor line signal voltages of phases opposite to each other are applied, respectively, the active matrix type liquid crystal display device includes: black signal insertion means applying a voltage corresponding to a black display as a voltage for each of the data signal lines, only in a black signal insertion period that is a part of one frame period; black insertion ratio change means changing the black signal insertion period; and unchanged-storage-capacitor-phase keeping means controlling the black signal insertion period after a change, at the time when the black signal insertion period is changed, so that (i) a time from a position in which a signal voltage of the first storage capacitor line or the second storage capacitor line falls to a position in which a first black insertion pulse rises in the black signal insertion period before the change becomes equal to (ii) a time from a position in which a signal voltage of the first storage capacitor line or the second storage capacitor line falls to a position in which a first black insertion pulse rises in the black signal insertion period after the change.

In order to solve the problem mentioned above, a drive method of an active matrix type liquid crystal display device of the present invention including: scanning signal lines; data signal lines; a pixel at each intersection of the scanning signal lines and the data signal lines, the pixel being composed of a plurality of sub-pixels; a first storage capacitor line forming a capacitor between the first storage capacitor line and a first sub-pixel electrode in at least one of the plurality of sub-pixels; and a second storage capacitor line forming a capacitor between the second storage capacitor line and a second sub-pixel electrode in at least another one of the plurality of sub-pixels, to which first storage capacitor line and second storage capacitor line signal voltages of phases opposite to each other are applied, respectively, the drive method comprising the steps of: inserting a black signal insertion so as to apply a voltage corresponding to a black display as a voltage for each of the data signal lines, only in a black signal insertion period that is a part of one frame period; changing a black insertion ratio so as to change the black signal insertion period; and keeping an unchanged storage capacitor phase so as to control the black signal insertion period after a change, at the time when the black signal insertion period is changed, so that (i) a time from a position in which a signal voltage of the first storage capacitor line or the second storage capacitor line falls to a position in which a first black insertion pulse rises in the black signal insertion period before the change becomes equal to (ii) a time from a position in which a signal voltage of the first storage capacitor line or the second storage capacitor line falls to a position in which a first black insertion pulse rises in the black signal insertion period after the change.

That is, in present invention, when the black signal insertion period is changed, a control is carried out such that that (i) a time from a position in which a signal voltage of the first storage capacitor line or the second storage capacitor line rises to a position in which a first black insertion pulse rises in the black signal insertion period before the change becomes equal to (ii) a time from a position in which a signal voltage of the first storage capacitor line or the second storage capacitor line rises to a position in which a first black insertion pulse rises in the black signal insertion period after the change.

This also makes it possible to provide an active matrix type liquid crystal display device capable of preventing the occurrence of a difference in luminance between an upper side of a display panel screen and a lower side of the display panel screen, in a case where black insertion is performed with respect to a display panel in which bright and dark sub-pixels are formed by changing, for every sub-pixel, an effective voltage to each pixel by capacitor coupling of the storage capacitor and the liquid crystal capacitor, and a drive method of the active matrix type liquid crystal display device.

In the active matrix type liquid crystal display device, it is preferable that: when a polarity of a data signal in each of the plurality of source lines is inverted, the black signal insertion means arranges a voltage of each of the plurality of data signal lines to be a voltage corresponding to a black display only in a predetermined black signal insertion period.

As a result, at the time when the polarity of the data signal is inverted, for example, the positive polarity does not directly turn into a negative polarity. After a voltage corresponding to a black voltage is once applied as a voltage of a data signal line subsequently to a voltage of the positive polarity, a voltage of the negative polarity is applied. This decreases a difference in voltage. Therefore, power consumption can be reduced.

Here, a time in which a voltage corresponding to a black display is applied at the time when the polarity of the data signal is inverted is a short time. Accordingly, only one application of the voltage corresponding to the black display is not sufficient for the black display.

In a dot inversion driving, a polarity is inverted a plurality of times in one frame. Therefore, shortage in wiring the black voltage can be compensated by applying a voltage corresponding to the black display at each of the plurality of times of the polarity inversions so as to apply the voltage a plurality of times.

Furthermore, in this method of writing the black voltage, a sufficient black insertion period is ensured while a charging period for writing pixel data is not shortened at a pixel capacitor. Further, it is not necessary to accelerate a movement speed of a source driver or the like for black insertion.

In the active matrix type liquid crystal display device of the present invention, it is preferable that the unchanged-storage-capacitor-phase keeping means includes storage means recording a plurality of output timings each corresponding to the black signal insertion period, for carrying out a control so that a phase with respect to the signal voltage of the first storage capacitor line or the second storage capacitor line in the black signal insertion period before the change is not different from a phase with respect to the signal voltage of the first storage capacitor line or the second storage capacitor line in the black signal insertion period after the change.

This makes it possible to carry out a control with the use of data stored in the storage means so that a phase with respect to the signal voltage of the first storage capacitor line or the second storage capacitor line in the black signal insertion period before the change is not different from a phase with respect to the signal voltage of the first storage capacitor line or the second storage capacitor line in the black signal insertion period after the change. Therefore, a complex circuit is not necessary.

Further, in the active matrix type liquid crystal display device of the present invention, it is preferable that the storage means is made of a lookup table.

This makes it possible to easily obtain a combination of a limited black insertion ratio and an optimum black signal insertion period with respect to the limited black insertion ratio.

Effect of the Invention

As described above, in the active matrix type liquid crystal display device of the present invention and the drive method of the active matrix liquid crystal display device, at the time when the black signal insertion period is changed, the black signal insertion period after the change is controlled so that (i) a time from a position where the signal voltage of the first or second storage capacitor line falls to a position where a first black insertion pulse rises in the black signal insertion period before the change becomes the same as (ii) a time from a position where the signal voltage of the first or second storage capacitor line falls to a position where a first black insertion pulse rises in the black signal insertion period after the change.

The active matrix type liquid crystal display device of the present invention and the drive method of the active matrix liquid crystal display device are provided with unchanged-storage-capacitor-phase keeping means. When the black signal insertion period is changed, the unchanged-storage-capacitor-phase keeping means controls the black signal insertion period after the change, so that (i) a time from a position where the signal voltage of the first or second storage capacitor line falls to a position where a first black insertion pulse rises in the black signal insertion period before the change becomes the same as (ii) a time from a position where the signal voltage of the first or second storage capacitor line falls to a position where a first black insertion pulse rises in the black signal insertion period after the change.

This makes it possible to provide an active matrix type liquid crystal display device capable of preventing the occurrence of a difference in luminance between an upper side of a display panel screen and a lower side of the display panel screen, in a case where black insertion is performed with respect to a display panel in which bright and dark sub-pixels are formed by changing, for every sub-pixel, an effective voltage to each pixel by capacitor coupling of the storage capacitor and the liquid crystal capacitor, and a drive method of the active matrix type liquid crystal display device.

BRIEF DESCRIPTION OF DRAWINGS (a), (b), and (c) of FIG. 1 are timing charts illustrating one embodiment of an active matrix type liquid crystal display device according to the present invention and a drive method thereof.

Figure 9:
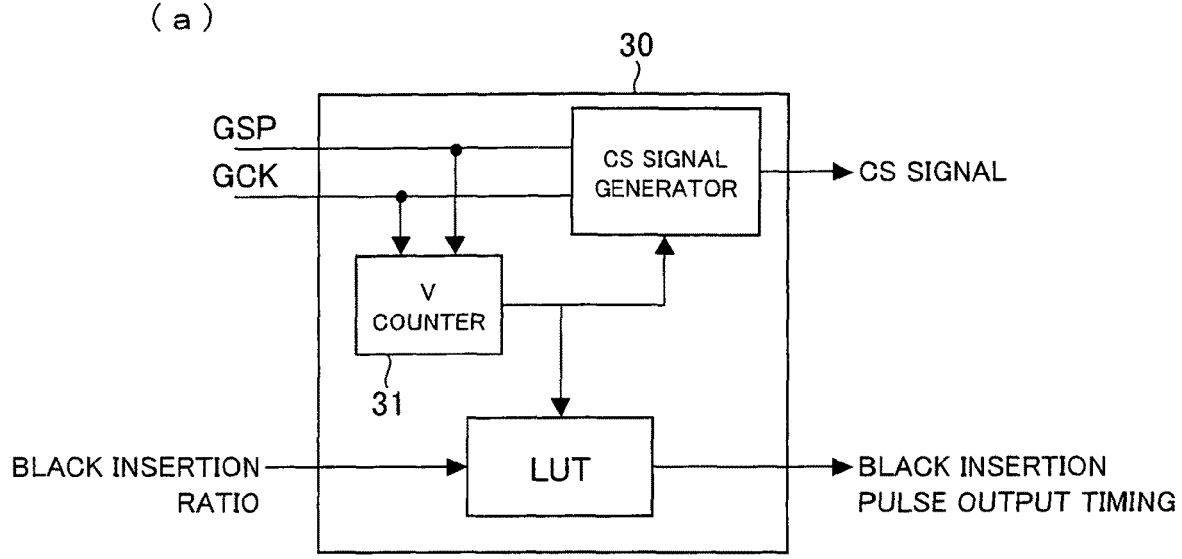

(a) of FIG. 9 is a block diagram illustrating a configuration of an unchanged-storage-capacitor-phase keeping control section. (b) of FIG. 9 is an explanatory chart illustrating stored contents of a lookup table.

Figure 10:
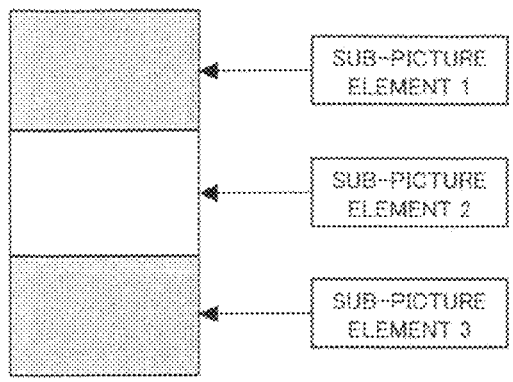
Figure 10:
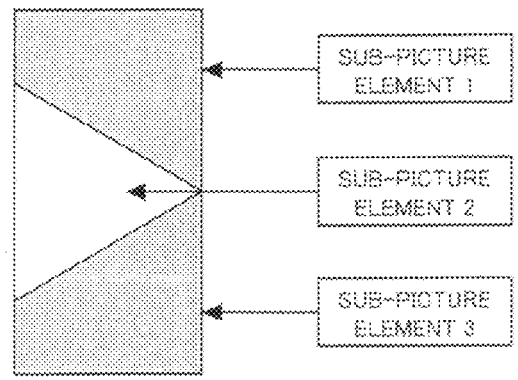
Figure 10:
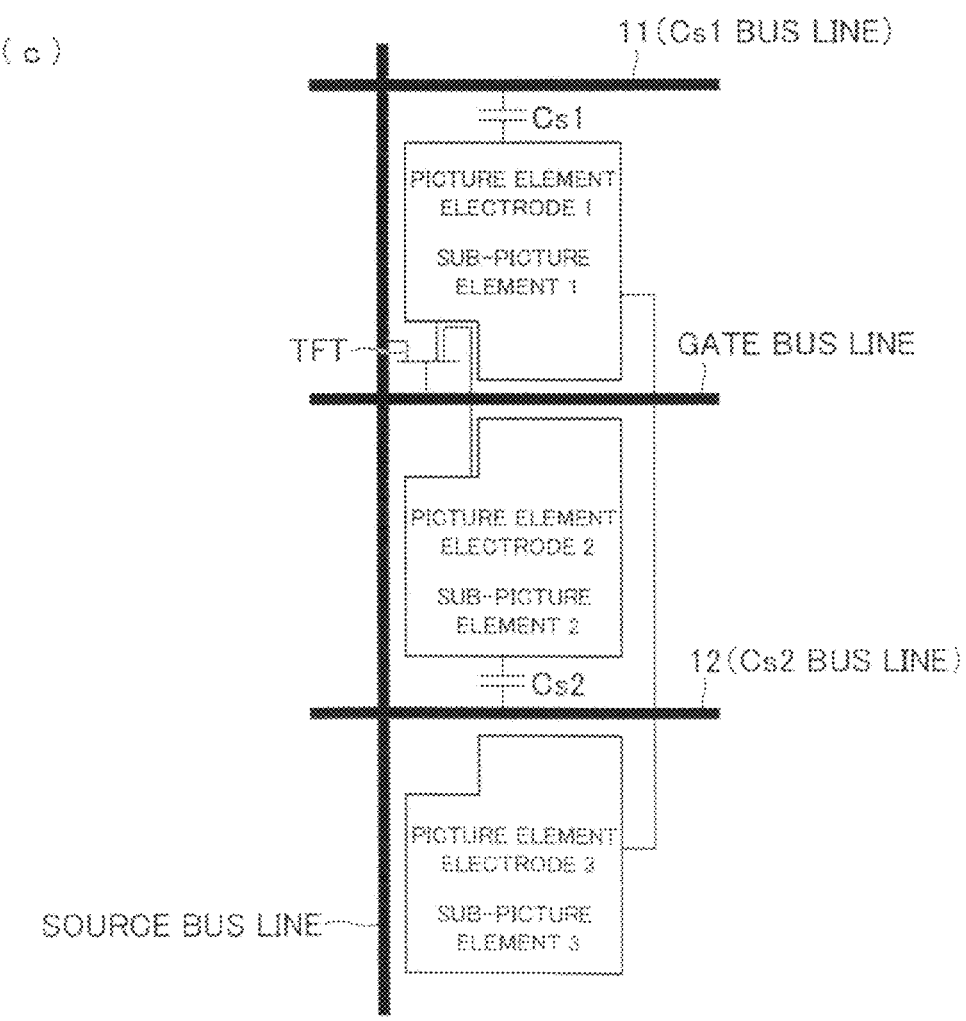

(a) and (b) of FIG. 10 are diagrams each schematically illustrating a triparted picture element. (c) of FIG. 10 is a plan view illustrating an arrangement of a pixel in the triparted multi-picture element structure.

Figure 11:
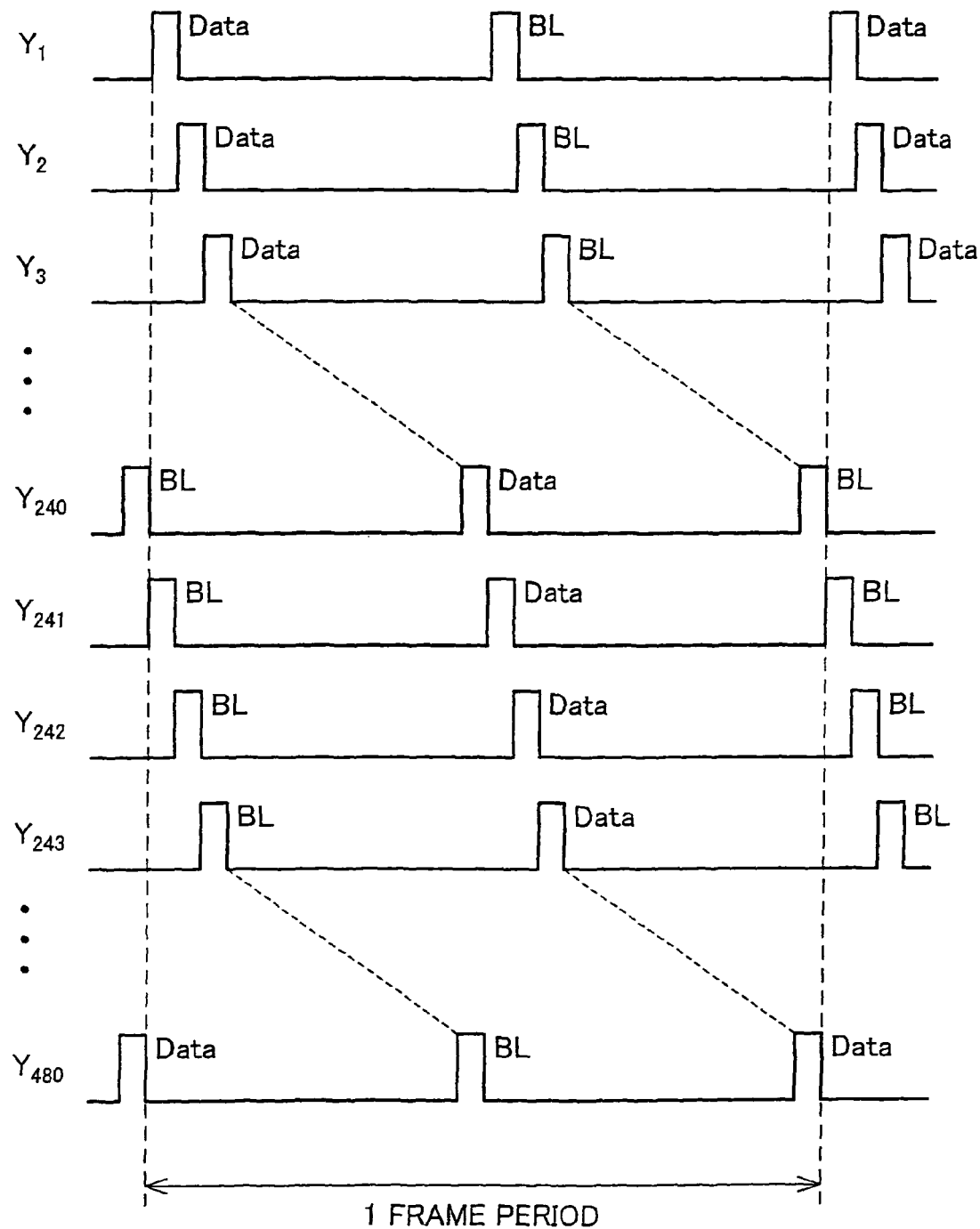

FIG. 11 is a timing chart illustrating a drive method of black insertion in a conventional active matrix type liquid crystal display device.

Figure 12:
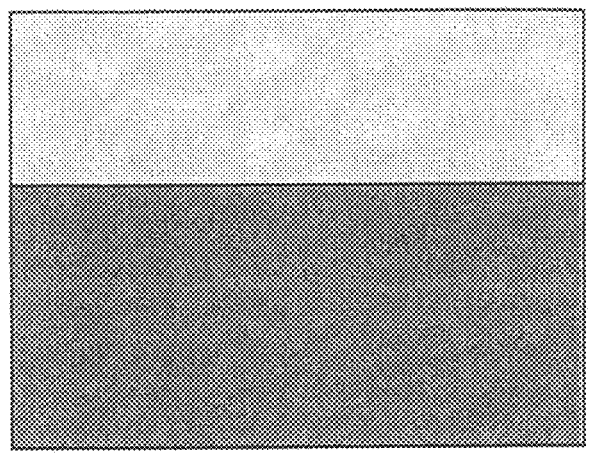

FIG. 12 is a plan view illustrating a display panel in which a difference in luminance occurs between an upper side of a screen and a lower side of the screen in the active matrix type liquid crystal display device.

Figure 13:
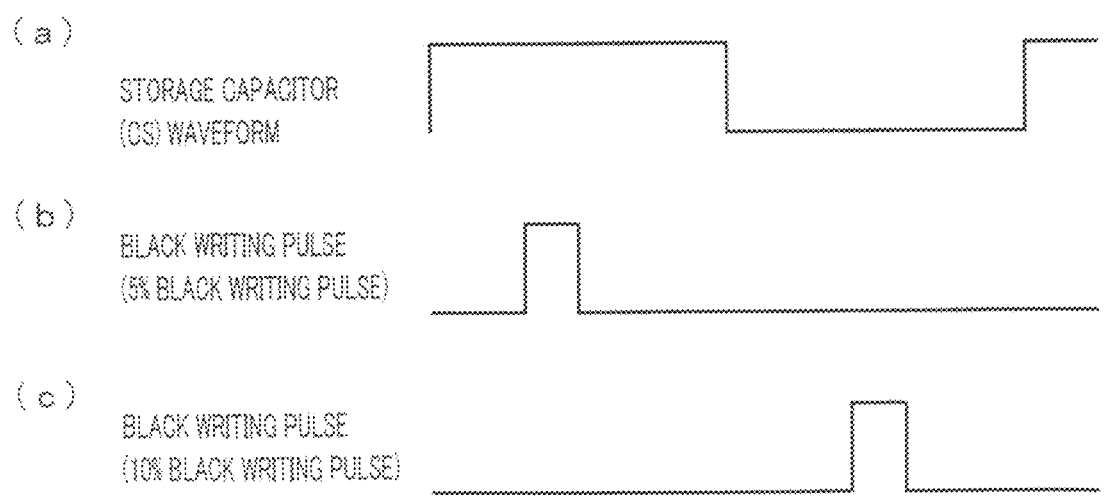

(a), (b), and (c) of FIG. 13 are timing charts illustrating a drive in a case where, at the time of changing a black signal insertion period, a phase of a first or second storage capacitor line with respect to a voltage signal in the black signal insertion period before the change is different from that in a changed black signal insertion period after the change, in the active matrix type liquid crystal display device.

REFERENCE NUMERALS

4 TFT
11 First Storage capacitor Line (First Storage capacitor Line)
12 Second Storage capacitor Line (Second Storage capacitor Line)
20 Liquid Crystal Display Device
21 Display Section
22 Gate Driver (Black Signal Insertion Means, Black Insertion Ratio Change Means)
23 Source Driver (Black Signal Insertion Means, Black Insertion Ratio Change Means)
24 Display Controlling Circuit (Black Signal Insertion Means, Black Insertion Ratio Change Means)
30 Unchanged-Storage-Capacitor-Phase Keeping Control Section (Unchanged-Storage-Capacitor-Phase Keeping Control Means, Black Insertion Control Means)
GL1 through GLm Gate Lines (Scanning signal Lines)
LUT Lookup Table (Storage Means)
P1 First Sub-Pixel
P2 Second Sub-Pixel
Pb Black Voltage Application Pulse
SL1 through SLn Source Line (Data Signal Lines)
T Time

BEST MODE FOR CARRYING OUT THE INVENTION

One embodiment of the present invention is explained below, with reference to FIGS. 1 through 9.

Figure 2:
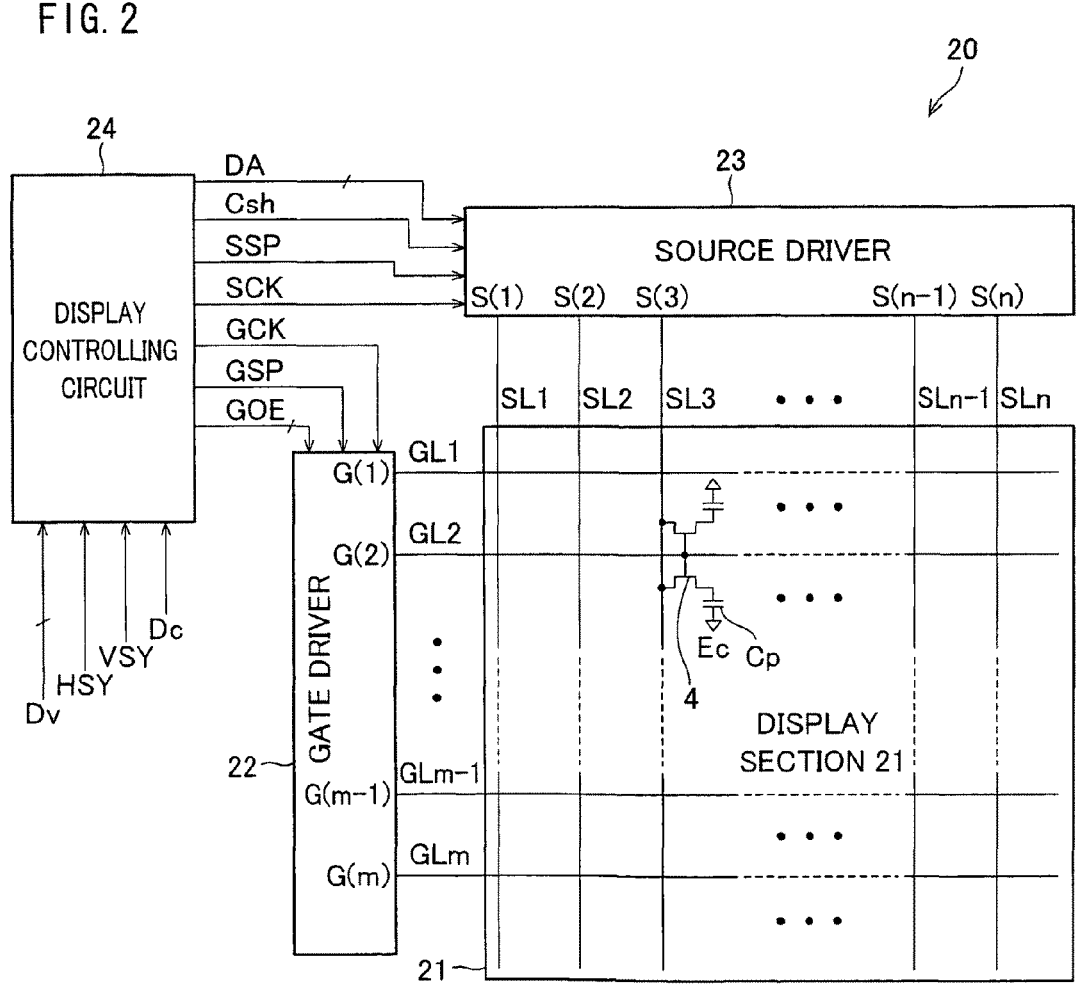
FIG. 2 is a block diagram illustrating a whole configuration of the active matrix type liquid crystal display device.

A liquid crystal display device 20 of the present embodiment, as illustrated in FIG. 2, includes a display section 21 of an active matrix type, a gate driver 22 that is a scanning signal line driving circuit, a source driver 23 that is a data signal line driving circuit, and a display controlling circuit 24 for controlling the source driver 23 and the gate driver 22.

The display section 21 includes gate lines GL1 through GLm as a plurality (m) of scanning signal lines, a plurality of source lines SL1 through SLn as a plurality (n) of data signal lines that intersect the gate lines GL1 through GLm, respectively, and a plurality (m×n) of pixel forming sections each of which that is provided so as to correspond to each intersection of the gate lines GL1 through GLm and the source lines SL1 through SLn.

The pixel forming sections are arranged in a matrix so as to form a pixel array. Each of the pixel forming sections includes a TFT4 that is a switching element whose gate terminal is connected to a gate line GLj passing through a corresponding intersection and whose source terminal is connected to a source line SLi passing through the intersection, a pixel electrode that is connected to a drain terminal of the TFT4, a common counter electrode Ec that is a counter electrode provided in common to the plurality of pixel forming sections, and a liquid crystal layer that is provided in common to the plurality of pixel forming sections and is sandwiched between the pixel electrode and the common counter electrode Ec.

A pixel capacitor Cp is formed by a liquid crystal capacitor that is formed by the pixel electrode and the common counter electrode Ec. As explained later, the pixel forming section has a multi-picture element structure in the present embodiment. Each pixel is split into two, that is, a first sub-pixel P1 and a second sub-pixel P2. A specific arrangement of the first sub-pixel P1 and the second sub-pixel P2 are explained later.

The picture electrode in the pixel forming section is provided with an electric potential in accordance with an image to be displayed, by the source driver 23 and the gate driver 22. The common counter electrode Ec is provided with a predetermined voltage (referred to as "common electrode electric potential) Vcom from a power supply circuit (not illustrated). As a result, a voltage in accordance with a difference between an electric potential of the pixel electrode and an electric potential of the common counter electrode Ec is applied to a liquid crystal. This voltage application controls an amount of light passing through the liquid crystal layer. As a result, an image display is performed. Note that a polarizer is used for controlling, by the voltage application with respect to the liquid crystal layer, the amount of light passing through the liquid crystal layer. In the present embodiment, a polarizer is provided so as to obtain a normally black mode.

The display controlling circuit 24 receives, from an external signal source, a digital video signal Dv indicative of an image to be displayed, a horizontal sync signal HSY and a vertical sync signal VSY that correspond to the digital video signal Dv, and a control signal Dc for controlling a display operation. Based on the digital video signal Dv, the horizontal sync signal HSY, the vertical sync signal VSY, and the control signal Dc, the display controlling circuit 24 generates and outputs, as signals for displaying an image indicated by the digital video signal Dv in the display section 21, a data start pulse signal SSP, a data clock signal SCK, a short circuit controlling signal Csh, a digital image signal DA (a signal equivalent to the video signal Dv) indicative of an image to be displayed, a gate start pulse signal GSP, a gate clock signal GCK, and a gate driver output controlling signal GOE.

More specifically, the display controlling section 24 outputs the digital video signal Dv as the digital image signal DA, after, according to need, carrying out timing adjustment or the like of the digital video signal Dv in an internal memory. Moreover, the display controlling circuit 24 generates the data clock signal SCK as a signal that is made of a pulse corresponding to each pixel of an image indicated by the digital image signal DA and also generates, based on the horizontal sync signal HSY, the data start pulse signal SSP as a signal that becomes high-level (H-level) only for a predetermined period in each one horizontal scanning period. Further, the display controlling circuit 24 generates, based on the vertical sync signal VSY, the gate start pulse signal GSP as a signal that becomes H-level for a predetermined period in each one frame period (one vertical scanning period), and also generates, based on the horizontal sync signal HSY, the gate clock signal GCK. Furthermore, the display controlling circuit 24 generates the short circuit controlling signal Csh and the gate driver output controlling signal GOE (GOE1 through GOEq), based on the horizontal sync signal HSY and the control signal Dc.

Among the signals thus generated by the display controlling circuit 24 as mentioned above, the digital image signal DA, the short circuit controlling signal Csh, and the data start pulse signal SSP and the data clock signal SCK for the source driver 23 are inputted into the source driver 23. On the other hand, the gate start pulse signal GSP and the gate clock signal GCK for the gate driver 22, and the gate driver output controlling signal GOE are inputted into the gate driver 22.

The source driver 23 sequentially generates, in each one horizontal scanning period, data signals S(1) through S(n) as analog voltages, based on the digital image signal DA, the data start pulse signal SSP, and the data clock signal SCK. Each of the analog voltages corresponds to a pixel value in each of the horizontal scanning lines which pixel value is of the image that is indicated by the digital image signal DA. Then, the source driver 23 applies these data signals S(1) through S(n) to the source lines SL1 through SLn, respectively.

The source driver 23 of the present embodiment employs a drive method in which the data signals S(1) through S(n) are outputted so that a polarity of the application voltage with respect to the liquid crystal layer is inverted for every one frame period and the polarity is also inverted, in each frame, for every line of the gate lines G1 through G2m and for every line of the source lines SL1 through SLn, that is, a dot inversion drive method. Accordingly, the source driver 23 inverts, every line of the source lines SL1 through SLn, the polarity of the application voltage with respect to each of the source lines SL1 through SLn. Further, the source driver 23 also inverts, every one horizontal scanning period, the voltage polarity of the data signal S(i) that is applied to each source line SLi.

Here, an electric potential that becomes a reference of the polarity inversion of the application voltage with respect to each of the source lines SL1 through SLn is at a direct current level (an electric potential equivalent to a direct current component) of each of the data signals S(1) through S(n). This direct current level generally does not agree with a direct current level of the common counter electrode Ec. The direct current level of each of the data signals S(1) through S(n) is different from the direct current level of the common counter electrode Ec by a level shift (field through voltage) ΔVd due to a parasitic capacitor Cgd between a gate and a drain of the TFT4 in each of the pixel forming sections. However, in a case where the level shift ΔVd due to the parasitic capacitor Cgd is sufficiently small with respect to an optical threshold voltage Vth, the direct current level of each of the data signals S(1) through S(n) is assumed to be equal to the direct current level of the common counter electrode Ec. Therefore, the polarity of each of the data signals S(1) through S(n), that is, the polarity of the application voltage with respect to each of the source lines SL1 through SLn is considered to invert every one horizontal period with reference to an electric potential of the common counter electrode Ec.

In the liquid crystal display device 20 of the present embodiment, a period in which a black display is performed is inserted in one frame period (hereinafter, referred to as "black insertion"), as a method of converting a display into a pseudo-impulse display.

A charge sharing method is employed as a method of the black insertion. In the charge sharing method, adjacent source lines are short-circuited at the time of polarity inversion of the data signals S(1) through S(n), for the purpose of reducing power consumption. In the time where the short circuit occurs, the black insertion is carried out.

The following explains such black insertion according to the charge sharing method in detail.

First, as illustrated in FIG. 3(a), an analog voltage signal d(i) is generated in the source driver 23 as a video signal whose polarity inverts every one horizontal scanning period (1H). The display controlling circuit 24, as illustrated in FIG. 3(b), generates a short circuit controlling signal Csh that becomes high-level (H-level) only for a predetermined period (a short period substantially equal to one horizontal blanking period) Tsh at the time when the polarity of the analog voltage signal d(i) is inverted (hereinafter, a period in which the short circuit controlling signal Csh becomes high-level (H-level) is referred to as a "short circuit period").

When the short circuit controlling signal Csh is low-level (L-level), the analog voltage signal d(i) is outputted as a data signal S(i). Meanwhile, when the circuit controlling signal Csh is H-level, adjacent source lines are short-circuited each other.

Here, in the present embodiment, because a dot inversion drive is employed, voltages of the adjacent source lines have polarities opposite to each other. Moreover, absolute values of the respective voltages are substantially the same. Accordingly, a value of each data signal S(i), that is, a voltage of each source line SLi becomes substantially equal to a direct current level VSdc of the data signal S(i) in the short circuit period Tsh. Alternatively, the voltage of the source line SLi in the short circuit period Tsh may be set at a constant voltage (for example, black voltage).

In this arrangement, the adjacent source lines are short-circuited at the time of the polarity inversion of the data signals so that the voltage of each source line becomes substantially equal to the black voltage (a direct current level VSdc of the data signal S(i) or common electrode electric potential Vcom). This arrangement is conventionally proposed as means for reducing power consumption, and not limited to the arrangement as illustrated in FIG. 3.

Here, the gate driver 22 selects gate lines GL1 through GLm sequentially, each substantially for one horizontal scanning period in each frame period (each vertical scanning period) of the digital image signal DA, for the purpose of writing each of the data signals S(1) through S(n) into a pixel capacitor of each of the image forming section according to the gate start pulse signal GSP and the gate clock signal GCK for the gate driver and the gate driver output controlling signal GOEr (r=1, 2, ..., q). Simultaneously, for the black insertion, the gate driver 22 selects a gate line GLj (j=1 to m) only for a predetermined period at the time of polarity inversion of the data signal S(i) (i=1 to n).

In other words, the gate driver 22 applies the scanning signals G(1) through G(m) to the gate lines GL(1) through GL(m), respectively. Each of the scanning signals G(1) through G(m) includes a pixel data writing pulse Pw and a black voltage application pulse Pb. The gate line GLj to which these pulses Pw and Pb are applied becomes a selected state. Subsequently, the TFTs that are connected to the gate line GLj in the selected state become an ON state (the TFTs that are connected to a gate line in an unselected state become an OFF state).

Figure 3:
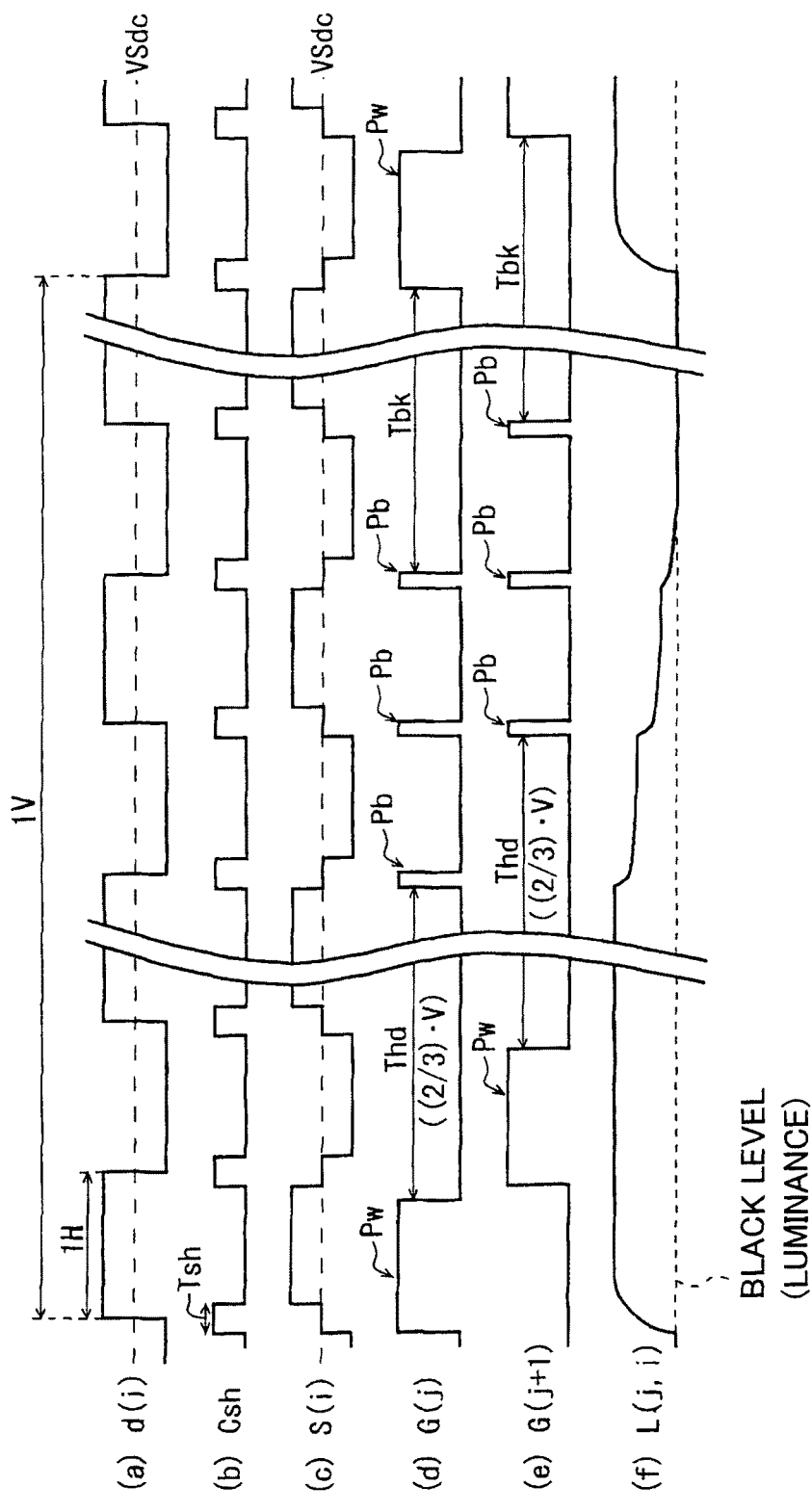
FIG. 3 is a timing chart illustrating a timing of black insertion in the active matrix type liquid crystal display device.

In the present embodiment, as illustrated in (d) and (e) of FIG. 3, in each scanning signal G(j), a ⅔ frame period exists between a pixel data writing pulse Pw and a black voltage application pulse Pb that first appears after the pixel data writing pulse Pw. Three black voltage application pulses Pb appear in series at an interval of one horizontal scanning period, in one frame period (1V).

Next, with reference to (a) through (f) of FIG. 3, how the display section 21 is driven by the source driver 23 and the gate driver 22 is explained.

In each of the pixel forming sections of the display section 21, the TFT 4 that is included in the pixel forming section is turned on due to application of a pixel data writing pulse Pw with respect to the gate line GLj that is connected to a gate terminal of the TFT4. Then, a voltage of the source line SLi that is connected to a source terminal of the TFT 4 is written into the pixel forming section as a value of the data signal S(i). In other words, the voltage of the source line SLi is kept in the pixel capacitor Cp. Subsequently, because the gate line GLj becomes an unselected state during a period Thd until a black voltage application pulse Pb comes in, the voltage that is written into the pixel forming section is kept as it is. The black voltage application pulse Pb is applied to the gate line GLj during a short circuit period Tsh after the period (hereinafter, referred to as "image data storage period") Thd in an unselected state of the gate line GLj.

As described above, in the short circuit period Tsh, a value of the data signal S(i), that is, a voltage of the source line SLi becomes substantially equal to a direct current level of the data signal S(i) (that is, the voltage becomes a black voltage). Therefore, the voltage stored in the pixel capacitor Cp of the pixel forming section varies towards the black voltage due to application of the black voltage application pulse Pb with respect to the gate line GLj.

However, a pulse width of the black voltage application pulse Pb is short. Accordingly, for the purpose of making it sure that the voltage stored in the pixel capacitor Cp becomes the black voltage, as illustrated in (d) and (e) of FIG. 3, three black application pulses Pb are applied to the gate line GLj in series at an interval of one horizontal scanning period (1H) in each frame period. This varies, as illustrated in (f) of FIG. 3, a luminance (a transmission light amount that is determined by the voltage stored by the pixel capacitor Cp) L (j, i) of a pixel that is formed by the pixel forming section connected to the gate line GLj. Accordingly, a display according to the digital image signal DA is performed in the pixel data storage period Thd, in one display line that corresponds to pixel forming sections connected to the gate line GLj. In the period Tbk after subsequent application of the three black voltage application pulses Pb until the next application of a pixel data writing pulse Pw with respect to the gate line GLj, a black display is performed. In this way, a period (hereinafter, referred to as "black display period") Tbk in which a black display is performed is inserted into each frame period. As a result, the liquid crystal display device 20 converts a display into an impulse display.

As clear from (d) and (e) of FIG. 3, a point at which the pixel data writing pulse Pw comes in is shifted by one horizontal scanning signal (1H) for every scanning signal G(j). Accordingly, a point at which the black voltage application pulse Pb comes in is also shifted by one horizontal scanning signal (1H) for every scanning signal G(j).

Therefore, the black display period Tbk is also shifted by one horizontal scanning period (1H) for every one display line, and black insertion of the same length is performed for all the display lines. In this way, a sufficient black insertion period can be ensured, while a charging period of the pixel capacitor Cp that is used in writing in the pixel data is not shortened. Further, it is not necessary to accelerate an operation speed of the source driver 23 or the like for the black insertion.

The liquid crystal display device 20 of the present embodiment further includes a multi-picture element structure, in addition to the black insertion according to the charge sharing method.

The following explains the multi-picture element structure in the liquid crystal display device 20 of the present embodiment.

First, in the multi-picture element structure, each pixel of red (R), green (G), and blue (B) is split into at least two sub-pixels, and each sub-pixel electrode is individually driven.

In a case where such a multi-picture element structure is applied, it is preferable that at least two of sub-pixels have luminances different from each other. According to this embodiment, both of a bright sub-pixel and a dark sub-pixel exist in one pixel. Accordingly, a halftone can be expressed by area coverage modulation. This arrangement is preferable in improving excessive brightness at an oblique viewing angle of a liquid crystal display screen. Moreover, the present embodiment is provided, for the purpose of forming a bright sub-pixel and a dark sub-pixel, with at least two storage capacitor lines to which signal voltages having phases opposite to each other are applied, respectively.

The signal voltages having phases opposite to each other which signal voltages are applied to the at least two storage capacitor lines indicate storage capacitor voltages that are used for operating area coverage modulation in a pixel having a pixel split structure. These storage capacitor voltages are classified into two kinds including a storage capacitor voltage (whose storage capacitor Cs polarity is +) that contributes to boosting of a drain signal voltage (Vs) supplied from a source and a storage capacitor voltage (whose storage capacitor Cs polarity is −) that contributes to pushing down of the drain signal voltage (Vs).

In such a pixel split method (area coverage modulation technique), an effective voltage applied to each pixel is changed for every sub-pixel by a storage capacitor voltage, and capacitive coupling of a storage capacitor Cs and a liquid crystal capacitor. This produces a bright sub-pixel and a dark sub-pixel, thereby realizing a multi-picture element driving.

Figure 4:
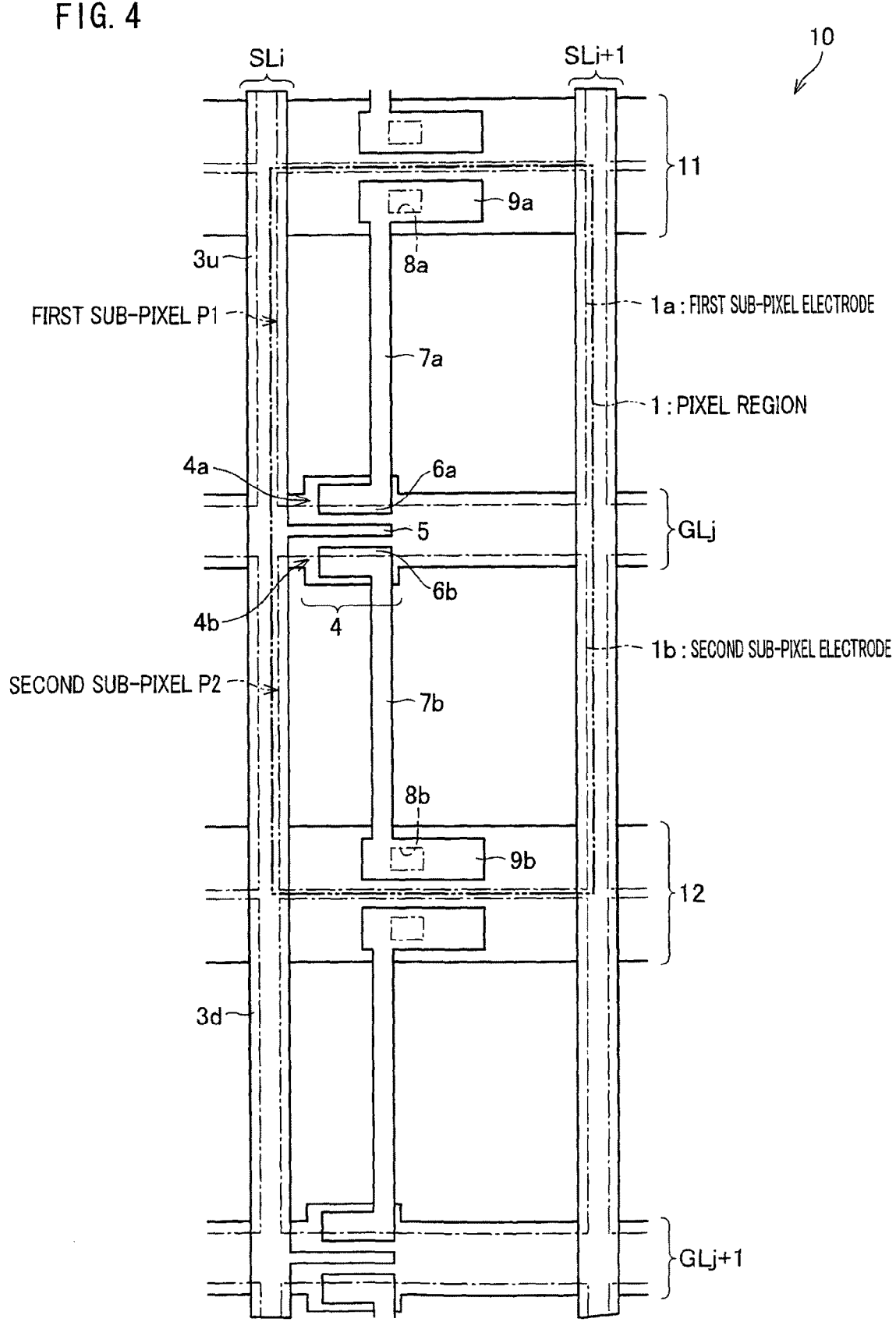
FIG. 4 is a plan view illustrating an arrangement of a pixel in a multi-picture element structure of the active matrix liquid crystal display device.

The following explains an arrangement of the liquid crystal display device 20 that includes an active matrix substrate 10 including the multi-picture element structure, with reference to FIG. 4. FIG. 4 is a plan view illustrating an arrangement of one pixel.

As illustrated in FIG. 4, the active matrix substrate 10 includes pixel regions 1 arranged in a matrix, gate lines GL1, . . . , GLj, GLj+1, . . . , GLn (row direction, right-left direction in FIG. 4), source lines SL1, . . . , SLi, SLi+1, . . . , SLn (column direction, up-down direction in FIG. 4), first storage capacitor lines 11, and second storage capacitor lines 12. The gate lines GL1, . . . , GLj, GLj+1, . . . , GLm and the source lines SL1, . . . , SLi, SLi+1, . . . , SLn, intersect each other orghogonally.

The pixel region 1 includes a TFT (Thin Film Transistor) 4 as a switching element that is an active element, at an intersection of the gate line GLj and a source line SLi. The TFT4 that is an active element includes the gate line GLj that serves as a gate electrode, a source electrode 5 that is connected to the source line SLi, and a first drain electrode 6a and a second drain electrode 6b that are opposed to each other. As a result, the TFT4 includes (i) a first TFT 4a that is constituted by the source electrode 5, the gate electrode that is connected to the gate line GLj, and the first drain electrode 6a and (ii) a second TFT 4b that is constituted by the source electrode 5, the gate electrode that is connected to the gate line GLj, and the second drain electrode 6b.

The first drain electrode 6a is connected to a first drain lead-out line 7a, and the second drain electrode 6b is connected to a drain lead-out line 7b. The first and second drain lead-out lines 7a and 7b are made of a conductive layer constituting a wiring section. The first drain lead-out line 7a is connected to a first sub-pixel electrode 1a via a first contact hole 8a, and the second drain lead-out line 7b is connected to a second sub-pixel electrode 1b via a second contact hole 8b. Each of the first and second contact holes 8a and 8b penetrates an interlayer insulating film.

Figure 5:
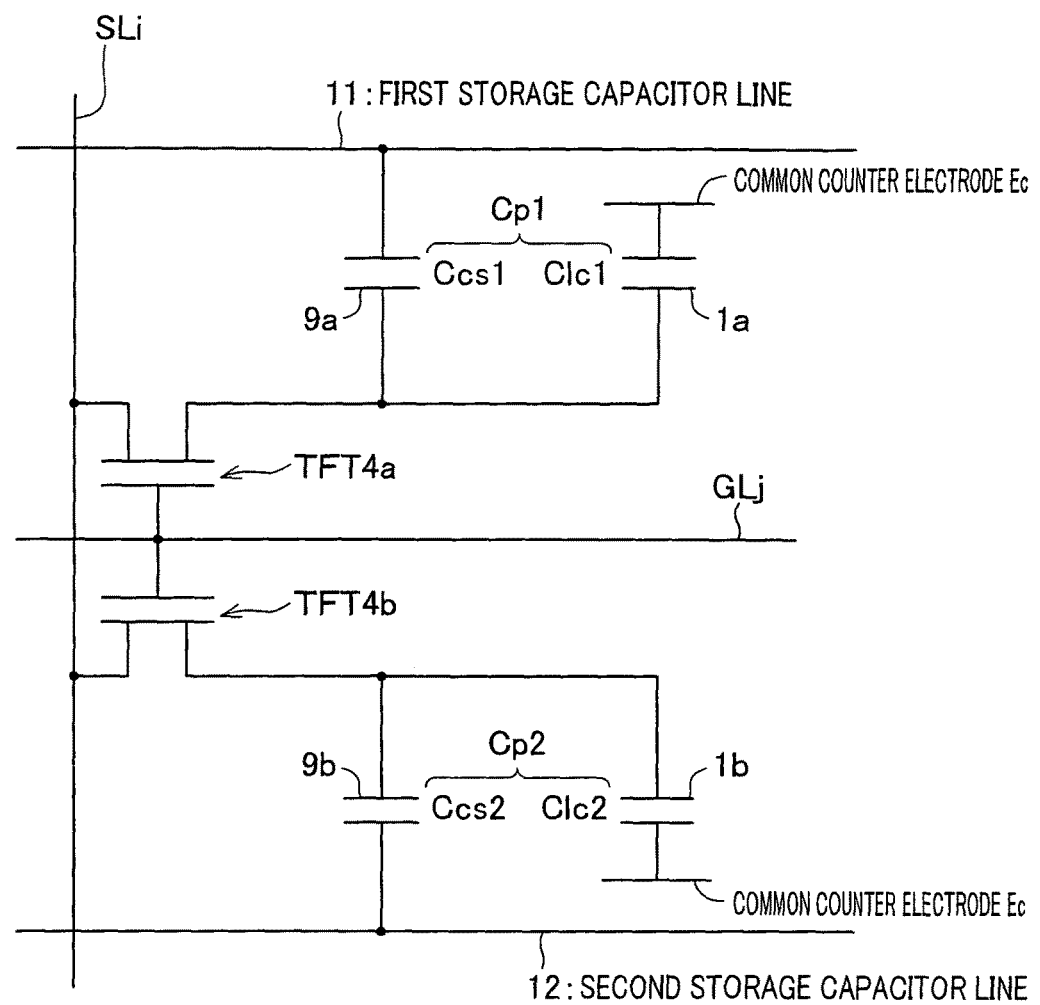
FIG. 5 is a circuit diagram illustrating an equivalent circuit of a pixel in the multi-picture element structure of the active matrix liquid crystal display device.

In each pixel of the active matrix substrate 10 in the arrangement, an equivalent circuit as shown in FIG. 5 is realized.

In other words, the first sub-pixel electrode 1a is connected to the source line SLi via the first TFT 4a, and the second sub-pixel electrode 1b is connected to the source line SL1 through SLn via the second TFT 4b. Both of the gates of the first TFT 4a and the second TFT 4b are connected to the gate line GLj. Moreover, a first storage capacitor Ccs1 is formed between an on-first-storage-capacitor electrode 9a that is connected to the first sub-pixel electrode 1a and the first storage capacitor line 11. A second storage capacitor Ccs2 is formed between an on-second-storage-capacitor electrode 9b that is connected to the second sub-pixel electrode 1b and the second storage capacitor line 12. The first storage capacitor line 11 and the second storage capacitor line 12 are provided with storage capacitor signals (auxiliary capacitor counter voltages) different from each other, respectively.

As illustrated in FIG. 5, a first sub-pixel capacitor Cp1 includes the first sub-pixel electrode 1a, the common counter electrode Ec, a liquid crystal layer that is provided between the first sub-pixel electrode 1a and the common counter electrode Ec. A second sub-pixel capacitor Cp2 includes the second sub-pixel electrode 1b, the common counter electrode Ec, the liquid crystal layer that is provided between the second sub-pixel electrode 1b and the common counter electrode Ec.

Figure 6:
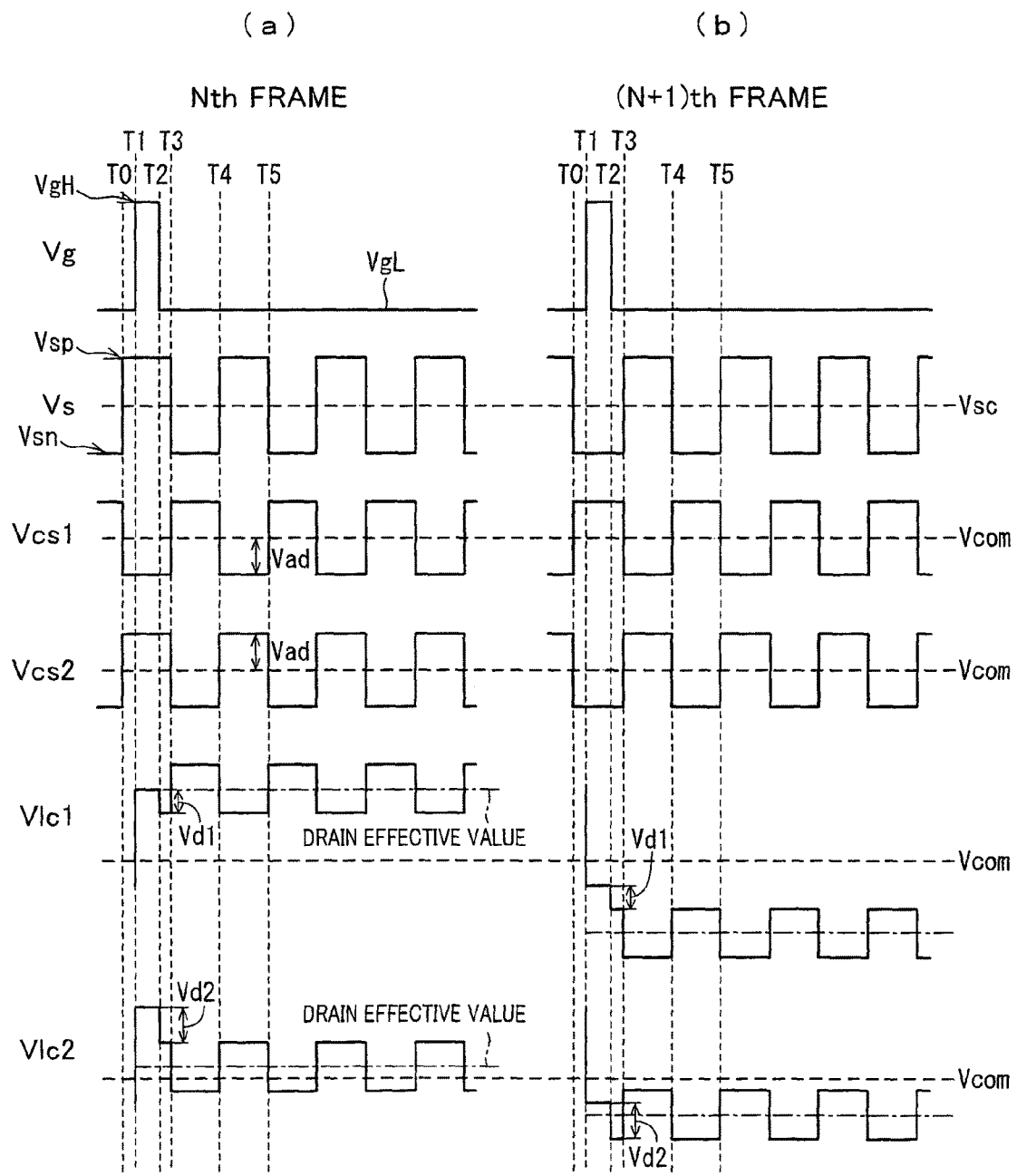
FIG. 6 is a timing chart illustrating a drive method of the active matrix type liquid crystal display device of the multi picture element structure.

Next, one example of a drive method using the storage capacitor signals is explained, with reference to the equivalent circuit of the pixel as illustrated in FIG. 5 and (a) and (b) of FIG. 6 illustrating a voltage waveform (timing) of each signal. (a) of FIG. 6 illustrates a driving waveform of an $n^{th}$ frame and (b) of FIG. 6 illustrates a driving waveform of an $(n+1)^{th}$ frame. Note that the waveform in (b) of FIG. 6 is a waveform whose polarity is inverted with respect to the waveform in (a) of FIG. 6. Moreover, this drive method simply illustrates a drive method of a multi-picture element structure, and the contents relating to a black insertion technique is omitted.

First, according to the voltage waveforms as illustrated in (a) and (b) of FIG. 6, the first sub-pixel P1 becomes a bright sub-pixel and the second sub-pixel P2 becomes a dark sub-pixel. Vg indicates a gate voltage. Vs indicates a source voltage. Vcs1 indicates a voltage of the storage capacitor line CS1 of the first sub-pixel P1, and Vcs2 indicates a voltage of the storage capacitor line CS2 of the second sub-pixel P2. Vlc1 and Vlc2 indicate voltages of the pixel electrodes of the first sub-pixel P1 and the second sub-pixel P2, respectively.

In the present embodiment, as illustrated in (a) of FIG. 6, Vsp of a positive polarity with respect to a center value Vsc of the source voltage is supplied to a source voltage in the $n^{th}$ frame. As illustrated in (b) of FIG. 6, Vsn of a negative polarity is provided to a source voltage in the subsequent $(n+1)^{th}$ frame. In addition, dot inversion is performed for every frame. For input of signals into the storage capacitor lines CS1 and CS2, the first storage capacitor voltage Vcs1 is oscillated at the amplitude voltage Vad, and the second storage capacitor voltage Vcs2 is oscillated at the amplitude voltage Vad. Then, a phase of the signal to the storage capacitor line CS1 is shifted by 180° from a phase of the signal to the storage capacitor line CS2. Thus obtained signals are inputted into the storage capacitor lines CS1 and CS2, respectively.

With reference to (a) of FIG. 6, the following explains a change with time in a voltage of each signal in the $n^{th}$ frame.

At the time T1, the gate voltage Vg changes from VgL to VgH. This turns on the first TFT 4a and the second TFT 4b of both of the sub-pixels. As a result, a voltage of Vsp is applied to a first liquid crystal capacitor Clc1, a second liquid crystal capacitor Clc2, the first storage capacitor Ccs1, and the second storage capacitor Ccs2.

At the time T2, the gate voltage Vg changes from VgH to VgL. This turns off the first TFT 4a of the first sub-pixel P1 and the second TFT 4b of the second sub-pixel P2. As a result, each of the source lines SL1 through SLn is electrically isolated from the first liquid crystal capacitor Clc1, the second liquid crystal capacitor Clc2, the first storage capacitor Ccs1, and the second storage capacitor Ccs2. Right after this, substantially the same drawing voltages are produced in the first sub-pixel P1 and the second sub-pixel P2 due to a drawing effect caused by an influence of a parasitic capacitor or the like. Consequently, the first sub-pixel voltage Vlc1 of the first sub-pixel P1 becomes:

$Vlc1=Vsp-Vd$, and the second sub-pixel voltage Vlc2 of the second sub-pixel P2 becomes:

$Vlc2=Vsp-Vd$.

Moreover, at this time, the first storage capacitor voltage Vcs1 is:

$Vcs1=Vcom-Vad$, and the second storage capacitor voltage Vcs2 is:

$Vcs2=Vcom+Vad$.

Note that a drawing voltage Vd is expressed in the following formula.

$Vd=(VgH-VgL)\times Cgd/(Clc(V)+Cgd+Ccs)$

In the formula, VgH and VgL respectively indicate a gate-on voltage and a gate-off voltage of each of the first TFT 4a and the second TFT 4b. Cgd indicates a parasitic capacitance that occurs between a gate and a drain of each of the first TFT 4a and the second TFT 4b. Clc (V) indicates an electrostatic capacitance (capacitance value) of a liquid crystal capacitor. Ccs indicates an electrostatic capacitance (capacitor value) of a storage capacitor Subsequently, at the time T3, the first storage capacitor voltage Vcs1 of the storage capacitor line CS1 varies from Vcom−Vad to Vcom+Vad, and the second storage capacitor voltage Vcs2 of the storage capacitor line CS2 varies from Vcom+Vad to Vcom−Vad. At this time, the first sub-pixel voltage Vlc1 of the first sub-pixel P1 becomes:

$Vlc1=Vsp-Vd+2\times K\times Vad$, and the second sub-pixel voltage Vlc2 of the second sub-pixel P2 becomes:

$Vlc2=Vsp-Vd-2\times K\times Vad$. Note that $K=Ccs/(Clc(V)+Ccs)$.

At the time T4, the first storage capacitor voltage Vcs1 varies from Vcom+Vad to Vco−Vad, and the second storage capacitor voltage Vcs2 varies from Vcom−Vad to Vcom+Vad. At this time, the first sub-pixel voltage Vlc1 is becomes:

$Vlc1=Vsp-Vd$, and the second sub-pixel voltage Vlc2 becomes:

$Vlc2=Vsp-Vd$.

At the time T5, the first storage capacitor voltage Vcs1 varies from Vcom−Vad to Vcom+Vad and the second storage capacitor voltage Vcs2 varies from Vcom+Vad to Vcom−Vad. At this time, the first sub-pixel voltage Vlc1 becomes:

$Vlc1=Vsp-Vd+2\times K\times Vad$, and the second sub-pixel voltage Vlc2 becomes:

$Vlc2=Vsp-Vd-2\times K\times Vad$.

Subsequently, each of the first storage capacitor voltage Vcs1, the second storage capacitor voltage Vcs2, the first sub-pixel voltage Vlc1, and the second sub-pixel voltage Vlc2 repeats alternately the operations of the time T4 and the time T5 for every integral multiple of the horizontal scanning period 1H, until Vg becomes equal to VgH next and writing is carried out. Accordingly, an effective value of the first sub-pixel voltage Vlc1 becomes:

$Vlc1=Vsp-Vd+K\times Vad$, and an effective value of the second sub-pixel voltage Vlc2 becomes:

$Vlc2=Vsp-Vd-K\times Vad$.

An effective voltage applied to the liquid crystal layer of each sub-pixel in the $n^{th}$ frame becomes:

$V1=Vsp-Vd+K\times Vad-Vcom$, and $V2=Vsp-Vd-K\times Vad-Vcom$.

Accordingly, the first sub-pixel P1 becomes a bright sub-pixel, and the second sub-pixel P2 becomes a dark sub-pixel.

As explained above, in a liquid crystal display device including an active matrix substrate 10 according to the present embodiment, the above-explained multi-pixel drive is carried out. Here, parasitic capacitors, that is, a parasitic capacitor between each of the source lines SL1 to SLn and the first sub-pixel electrode 1a, a parasitic capacitor between each of the source lines SL1 to SLn and the second sub-pixel electrode 1b, and the like are omitted in the explanation. Moreover, for simplification, a phase of the first storage capacitor voltage Vcs1 is shifted by 180° from a phase of the second storage capacitor voltage Vcs2 in the present embodiment. However, as long as the sub-pixels that constitute one pixel become a bright pixel and a dark pixel, respectively, the phase difference does not necessarily have to be 180°. Further, in the present embodiment, pulse widths of the first storage capacitor voltage Vcs1 and the second storage capacitor voltage Vcs2 are arranged to be equal to a pulse width of Vs. However, an arrangement of the present embodiment is not limited to this. For example, the pulse width may be changed in consideration of charge shortage in a storage capacitor due to a delay in a storage capacitor signal in a case where a liquid crystal display device that is large in size and highly fine is driven.

Here, in the liquid crystal display device 20 having the multi-picture element structure, a black insertion technique according to the above-described charge sharing method is applied.

A driving operation in this case is explained with reference to FIG. 7.

Figure 7:
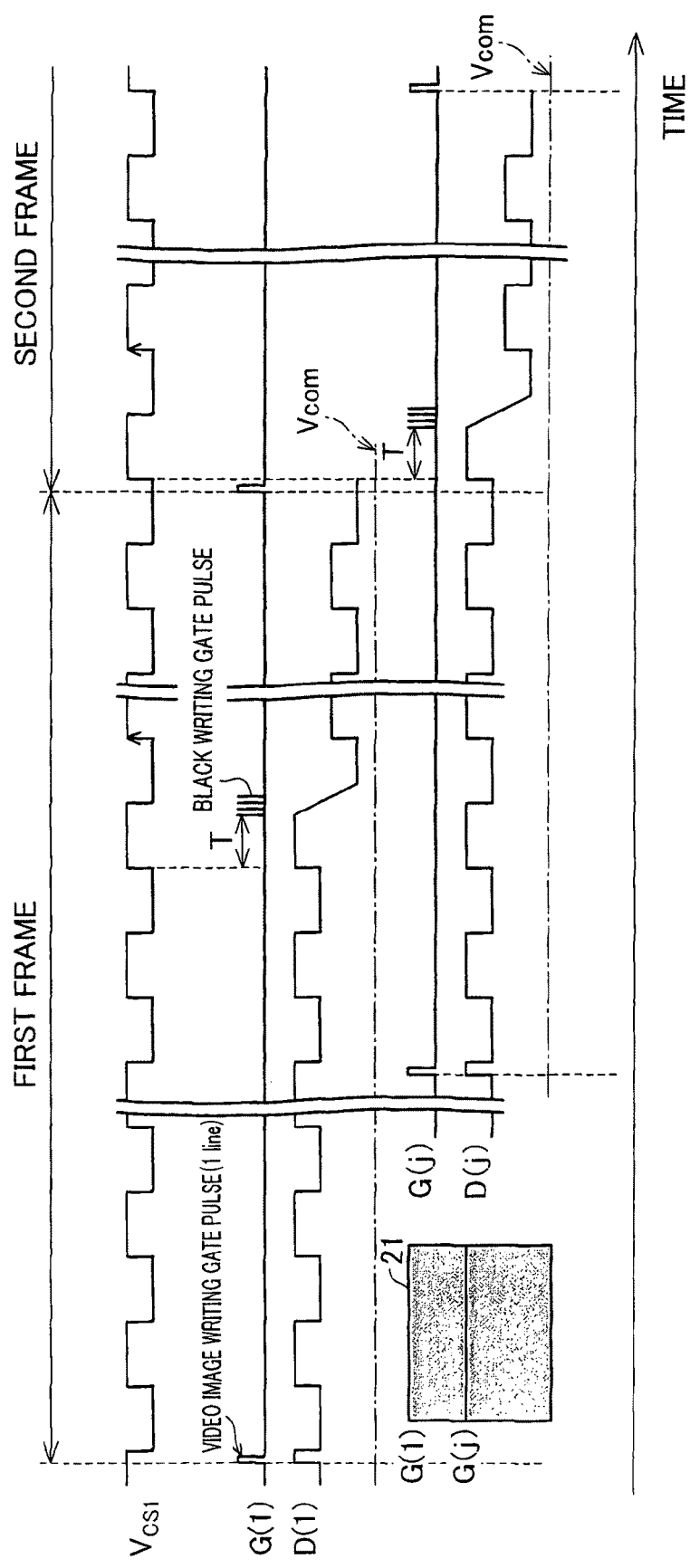
FIG. 7 is a timing chart illustrating a drive in a case where, at the time of changing a black signal insertion period, a phase of a first or second storage capacitor line with respect to a voltage signal in the black signal insertion period before the change is not different from that in a changed black signal insertion period after the change.

As illustrated in FIG. 7, in a first frame, for example, the first storage capacitor voltage Vcs1 is applied as a rectangular pulse to a first line of a screen. At this time, a pixel data writing pulse Pw and a black voltage application pulse Pb are applied to the gate line GL1. Here, an insertion ratio of the black voltage application pulse Pb is arranged to be, for example, 30 percent of one frame.

When the last pulse of the black voltage application pulse Pb is applied, as illustrated in FIG. 7, a waveform of the first storage capacitor voltage Vcs1 is boosted. Accordingly, a drain voltage D (1) behaves in accordance with the first storage capacitor voltage Vcs1.

In the same manner, the first storage capacitor voltage Vcs1 is applied as a rectangular pulse to a $j^{th}$ line of the screen. At this time, a pixel data writing pulse Pw and a black voltage application pulse Pb are applied to the gate line GLj. When the last pulse of the black voltage application pulse Pb is applied, as illustrated in FIG. 7, a waveform of the first storage capacitor voltage Vcs1 is boosted. Accordingly, a drain voltage D (j) behaves in accordance with the first storage capacitor voltage Vcs1. That is, the drain voltage D (j) behaves in the same manner as the first line.

Therefore, effective application voltages of the liquid crystal between the drain voltage and the counter voltage (Vcom) are the same in the first line and the $j^{th}$ line, and luminance difference does not occur. Therefore, the display section 21 performs a uniform display, as illustrated in FIG. 7.

In the black insertion according to the charge sharing method, the black insertion ratio can be varied by changing a timing of the black voltage application pulse Pb. It is possible to reduce a moving image blur by raising the black insertion ratio at the time when a display video image that includes a lot of movement, to stop black insertion at the time of a static image and perform a hold display, or the like.

A case where the black insertion ratio is changed from 30% per frame as mentioned above to 25% per frame is considered as an example. A driving operation of this case is explained with reference to FIG. 8.

Figure 8:
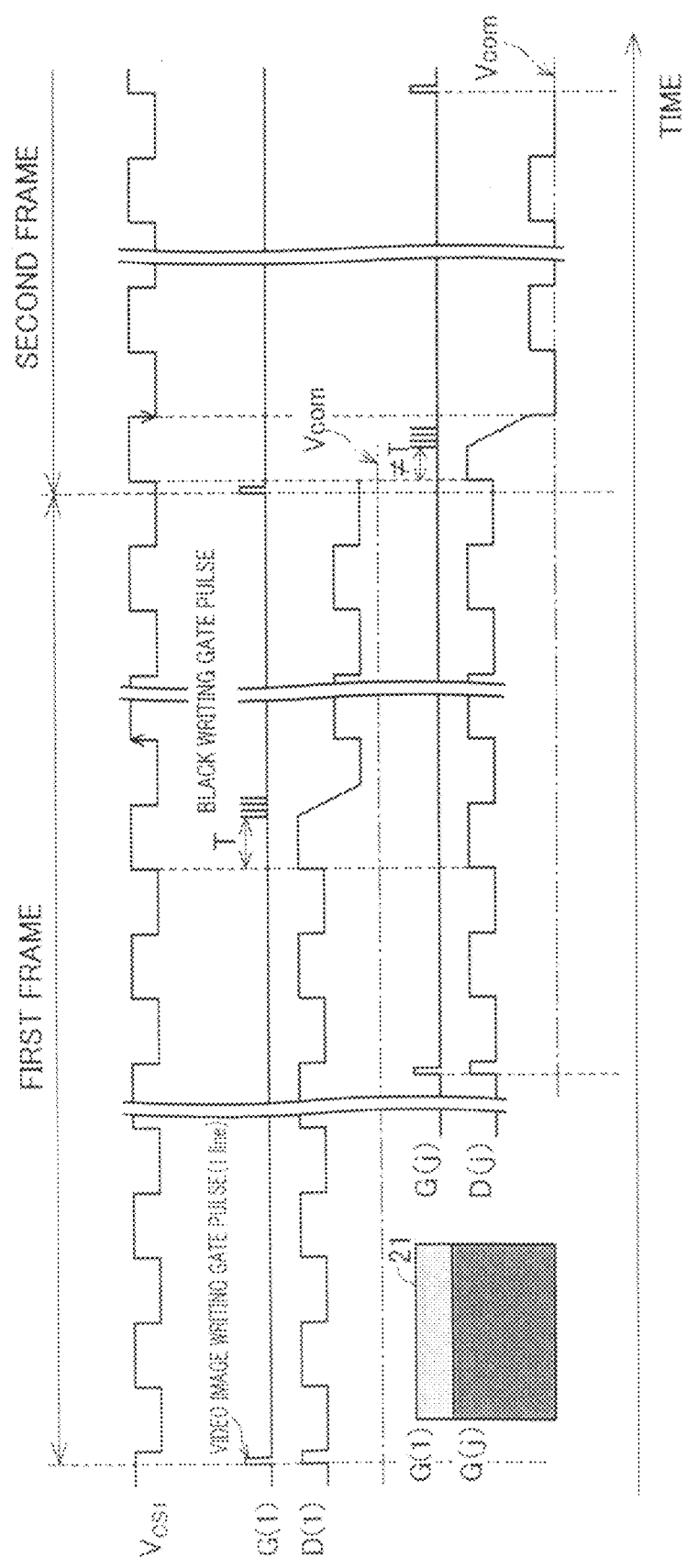
FIG. 8 is a timing chart illustrating a drive in a case where, at the time of changing a black signal insertion period, a phase of a first or second storage capacitor line with respect to a voltage signal in the black signal insertion period before the change is different from that in a changed black signal insertion period after the change.

That is, as illustrated in FIG. 8, in the first frame, for example, the first storage capacitor voltage Vcs1 is applied as a rectangular pulse in the first line of the screen. At this time, a pixel data writing pulse Pw and a black voltage application pulse Pb are applied to the gate line GL1.

When the last pulse of the black voltage application pulse Pb is applied, as illustrated in FIG. 8, a waveform of the first storage capacitor voltage Vcs1 is boosted. Accordingly, a drain voltage D (1) behaves in accordance with the first storage capacitor voltage Vcs1. Up to here, the operation is the same as the operation described in FIG. 7.

However, for example, in the $j^{th}$ line of the screen, the first storage capacitor voltage Vcs1 is applied as a rectangular pulse. At this time, a pixel data writing pulse Pw and a black voltage application pulse Pb are applied to the gate line GLj. When the last pulse of the black voltage application pulse Pb is applied, as illustrated in FIG. 8, a waveform of the first storage capacitor voltage Vcs1 is pushed down. Accordingly, a drain voltage D (j) behaves in accordance with the first storage capacitor voltage Vcs1. As a result, as illustrated in FIG. 8, the drain voltage D (j) behaves in a different manner from the first line.

Consequently, an effective application voltage of the liquid crystal between the drain voltage and the counter voltage Vcom in the first line becomes different from that in the $j^{th}$ line. Therefore, as illustrated in FIG. 8, the display section 21 turns into a state in which a luminance difference is produced.

A cause that differentiates the effective application voltages of the liquid crystal is that, as illustrated in (a), (b), and (c) of FIG. 13 that are explanatory charts of an example of a conventional technique, there are different phases with respect to the rectangular pulse of the first storage capacitor voltage Vcs1 in which phases the black voltage application pulses Pb are applied, respectively.

Figure 1:
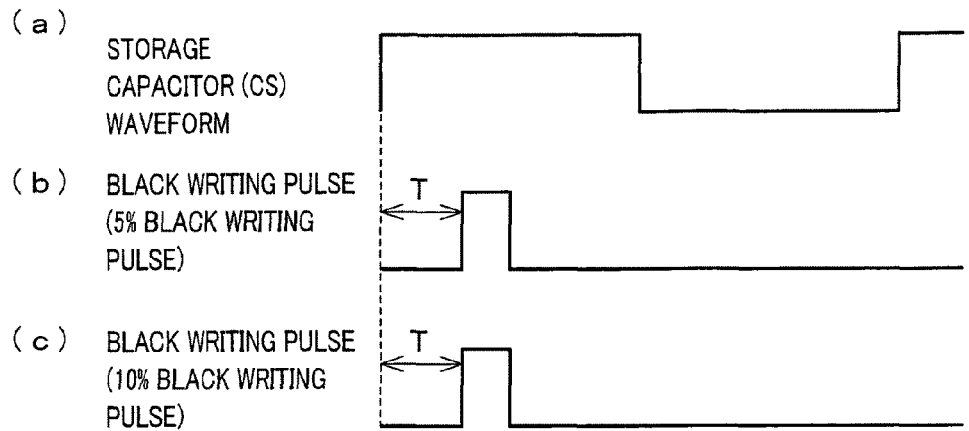

In the liquid crystal display device 20 of the present embodiment, in order to solve this problem, as illustrated in (a), (b), and (c) of FIG. 1, phases with respect to the rectangular pulse of the first storage capacitor voltage Vcs1 in which phases the black voltage application pulses Pb are applied are adjusted to be the same each other.

Specifically, as illustrated in (a) of FIG. 9, the unchanged-storage-capacitor-phase keeping control section 30 is provided. The phases are controlled to be the same by a lookup table LUT as storage means that is provided in the unchanged-storage-capacitor-phase keeping control section 30.

That is, as illustrated in (b) of FIG. 9, the lookup table LUT stores a combination of a black insertion ratio and an output timing of the black voltage application pulse Pb. The lookup table LUT stores the combination for the purpose of having a constant phase relationship between the black voltage application pulse Pb and the waveform of the storage capacitance voltage Vcs, with respect to a certain black insertion ratio. Here, the following are defined:

Black Insertion Ratio=Black Writing Period/1 Frame

=Output Timing of Black Voltage Application Pulse Pb/Vtotal, where: Vtotal indicates the number of gate clock signals GCK in one frame; and the output timing of the black voltage application pulse Pb indicates the number of the gate clock signals GCK from the beginning of the one frame to output of the black voltage application pulse Pb.

Here, the liquid crystal display device 20 includes, for example, a display section 21 of full high definition (FHD) which includes scanning signal lines (VDISP) whose number is 1080 and data signal lines (HDISP) whose number is 1920.

Here, for example, in the case of a black insertion ratio=26% and Vtotal=1112, the output timing of the black voltage application pulse Pb becomes Vtotal−289=1112−289=823. Accordingly, if the black voltage application pulse Pb starts to be outputted from a position where the number V of the gate clock signal GCK is 823, it is possible to have a constant phase relationship between the black voltage application pulse Pb and the storage capacitor voltage Vcs.

In the lookup table LUT of the present embodiment, values are set by assuming that the maximum black insertion ratio is 30% and setting 16 levels for the black insertion ratios 0% through 30%. However, the lookup table LUT is not necessarily limited to this. The lookup table LUT may be designed according to a black insertion ratio that is adopted.

By using the lookup table LUT above, a method of obtaining an output timing of the black voltage application pulse Pb is explained.

That is, as illustrated in (a) of FIG. 9, the number of the gate clock signals GCK is counted at a V counter 31, by using the gate start pulse signals GSP and the gate clock signals GCK, and Vtotal is obtained. Then, with reference to the lookup table LUT according to thus obtained Vtotal and a black insertion ratio, an insertion start output timing for the black voltage application pulse Pb is calculated. Then, the number of the gate clock signals GCK is counted. Subsequently, when the number of the gate clock signals GCK agrees with the insertion start output timing of the black voltage application pulse Pb, the black voltage application pulse Pb starts to be outputted.

The present embodiment explains a drive of the multi-picture element in which a pixel is composed of two sub-pixels. The present embodiment is not necessarily limited to this, but, in the present invention, the present embodiment is applicable to a case of a drive of a multi-picture element in which a pixel is composed of a plurality of sub-pixels.

That is, as illustrated in (a) and (b) of FIG. 10, one pixel can be split into, for example, three sub-pixels. In this triparted picture element, sub-pixels 1 and 3 have the same luminance while a sub-pixel 2 has a luminance different from those of the sub-pixels 1 and 3. For the purpose of carrying out a drive of such a multi-picture element, for example, as illustrated in (c) of FIG. 10, a pixel electrode of the sub-pixel 1 is electrically connected to a pixel electrode of the sub-pixel 3 so that the sub-pixels 1 and 3 have the same luminance. In this case, the drive of the multi-picture element is possible by using two kinds of wirings including a first storage capacitor line 11 and a second storage capacitor line 12 in the same manner as described above.

In this way, the liquid crystal display device 20 of the present embodiment and a drive method thereof include gate lines GL1 through GLm, source lines SL1 through SLn, a pixel at each intersection of the gate lines GL1 through GLm and the source lines SL1 through SLn which pixel is composed of two sub-pixels. Moreover, a first storage capacitor line 11 is provided so as to form a capacitor between the first storage capacitor line 11 and a first sub-pixel electrode 1a of one sub-pixel of the two sub-pixels including the first sub-pixel P1 and the second sub-pixel P2. Moreover, a second storage capacitor line 12 is provided so as to form a capacitor between the second storage capacitor line 12 and a second sub-pixel electrode 1b of the other sub-pixel of the two sub-pixels. Signal voltages whose phases are opposite to each other are applied to the first storage capacitor line 11 and the second storage capacitor line 12, respectively. Note that the present embodiment is applicable in a case where the pixel is composed of a plurality of sub-pixels.

Moreover, in the present embodiment, black insertion is carried out so as to produce a pseudo-impulse display. Specifically, each of the display controlling circuit 24, the gate driver 22, and the source driver 23 as black signal insertion means applies a voltage corresponding to a black display as a voltage for each signal data line only in a black signal insertion period that is a part of one frame period. Further, each of the display controlling circuit 24, the gate driver 22, and the source driver 23 as black insertion ratio change means changes the black signal insertion period.

In such an active matrix type liquid crystal display device 20, according to a change in the black insertion ratio, a difference in luminance may occur in the display section 21 in relation to a waveform of the storage capacitor voltage.

Accordingly, in the present embodiment, in order to solve this problem, an unchanged-storage-capacitor-phase keeping control section 30 is provided for controlling the black signal insertion period after a change, at the time when the black signal insertion period is changed, so that (i) a time T from a position in which a signal voltage of the first storage capacitor line 11 or the second storage capacitor line 12 rises to a position in which a first black insertion pulse rises in the black signal insertion period before the change becomes equal to (ii) a time T from a position in which a signal voltage of the first storage capacitor line 11 or the second storage capacitor line 12 rises to a position in which a first black insertion pulse rises in the black signal insertion period after the change.

Moreover, in the present embodiment, in order to solve the problem, an unchanged-storage-capacitor-phase keeping control section 30 for controlling the black signal insertion period after a change, at the time when the black signal insertion period is changed, so that (i) a time from a position in which a signal voltage of the first storage capacitor line 11 or the second storage capacitor line 12 falls to a position in which a first black insertion pulse rises in the black signal insertion period before the change becomes equal to (ii) a time from a position in which a signal voltage of the first storage capacitor line 11 or the second storage capacitor line 12 falls to a position in which a first black insertion pulse rises in the black signal insertion period after the change.

Accordingly, the present embodiment is capable of providing an active matrix type liquid crystal display device 20 capable of preventing a difference in luminance between an upper side of a screen of a display panel and a lower side of the screen of the display panel, in a case where black insertion is performed with respect to the display panel in which a bright sub-pixel and a dark sub-pixel are produced by changing, for every sub-pixel, an effective voltage to each pixel by capacitor coupling of a storage capacitor and a liquid crystal capacitor, and a drive method of the active matrix type liquid crystal display device 20.

Moreover, in the liquid crystal display device 20 of the present embodiment, when the black signal insertion period is changed, a control is carried out so that a phase with respect to the signal voltage of the first storage capacitor line 11 or the second storage capacitor line 12 at a last position of the black signal insertion period before the change does not differ from a phase with respect to the signal voltage of the first storage capacitor line 11 or the second storage capacitor line 12 at the last position of the black signal insertion period after the change. This makes it possible to reliably prevent the occurrence of a difference in luminance in the display section.

Further, in the active matrix type liquid crystal display device 20 of the present embodiment, when a polarity of a data signal in each of the plurality of source lines SL1 through SLn is inverted, a voltage of each of the plurality of data signal lines is arranged to be a voltage corresponding to a black display only in a predetermined black signal insertion period.

As a result, when a polarity of a data signal is inverted, for example, a positive polarity does not change directly to a negative polarity. However, after a voltage corresponding to a black display is applied once as a voltage of the data signal line subsequently to a voltage of a positive polarity, a voltage of a negative polarity is applied. Accordingly, because a difference in voltage becomes small, power consumption can be reduced.

Furthermore, in a dot inversion driving, the polarity inverts a plurality of times in one frame period. Accordingly, by applying a voltage corresponding to a black display at each of the plurality of polarity inversions so as to apply the voltage a plurality of times, it becomes possible to compensate a shortage in writing the black voltage.

In this black voltage writing method, a charging period is not shortened at a pixel capacitor which is a target of pixel data writing. This ensures a sufficient black insertion period. In addition, it is not necessary to accelerate an operation speed of the source driver or the like for the black insertion.

The active matrix type liquid crystal display device 20 of the present embodiment includes storage means recording a plurality of output timings each corresponding to the black signal insertion period, for carrying out a control such that a phase with respect to the signal voltage of the first storage capacitor line 11 or the second storage capacitor line 12 in the black signal insertion period before the change is not different from a phase with respect to the signal voltage of the first storage capacitor line 11 or the second storage capacitor line 12 in the black signal insertion period after the change.

This makes it possible to perform the control, with the use of data that is recorded in the storage means, such that a phase with respect to a signal voltage of the first storage capacitor line 11 or the second storage capacitor line 12 before a change in the black signal insertion period does not differ from a phase with respect to a signal voltage of the first storage capacitor line 11 or the second storage capacitor line 12 after the change in the black signal insertion period. Therefore, a complex circuit is not necessary.

In the active matrix type liquid crystal display device 20 of the present embodiment, the storage means is made of a lookup table LUT. This makes it possible to easily obtain a combination of a black insertion ratio in a limited range and an optimum black signal insertion period with respect to the black insertion ratio.

INDUSTRIAL APPLICABILITY

The present invention is applicable to an active matrix type liquid crystal display device in which black insertion is carried out with respect to a display panel of a multi-picture element structure where a bright sub-pixel and a dark sub-pixel are produced by changing, for every sub-pixel, an effective voltage to each pixel by capacitor coupling of a storage capacitor and a liquid crystal capacitor, and a drive method of the active matrix type liquid crystal display device.

The invention claimed is:

1. An active matrix type liquid crystal display device including: scanning signal lines; data signal lines; a pixel at each intersection of the scanning signal lines and the data signal lines, the pixel including a plurality of sub-pixels; a first storage capacitor line forming a first capacitor between the first storage capacitor line and a first sub-pixel electrode in at least one of the plurality of sub-pixels; and a second storage capacitor line forming a second capacitor between the second storage capacitor line and a second sub-pixel electrode in at least another one of the plurality of sub-pixels, to which first storage capacitor line and second storage capacitor line signal voltages of phases opposite to each other are periodically applied, respectively, the active matrix type liquid crystal display device comprising:

a black signal insertion device to apply a voltage corresponding to a black display as a voltage for each of the data signal lines as a black insertion pulse at a start timing of a black signal insertion period that is a part of one frame period;

a black insertion ratio change device to change a total length of the black signal insertion period by changing a timing of the black insertion pulse; and an unchanged-storage-capacitor-phase-keeping device to control the black signal insertion period, so that a time difference, before the change of the black signal insertion period, between:

(i) a timing, among timings at which signal voltages of the first or second storage capacitor line rise, at which a storage capacitor voltage rises that is both prior to the start timing of the black signal insertion period and a closest timing to the start timing of the black signal insertion period, and (ii) the start timing of the black signal insertion period;

becomes the same as the time difference, after the change of the black signal insertion period, between:

(iii) the timing, among the timings at which the signal voltages of the first or second storage capacitor line rise, at which the storage capacitor voltage rises that is both prior to the start timing of the black signal insertion period and the closest timing to the start timing of the black signal insertion period, and (iv) the start timing of the black signal insertion period;

wherein the unchanged-storage-capacitor-phase-keeping device controls the black signal insertion period after the change of the black signal insertion period so that a time difference between (a) the timing at which the storage capacitor voltage rises and (b) a timing at which the black insertion pulse rises, the black insertion pulse being applied first to each of the scanning signal lines during the black signal insertion period, becomes the same before and after the change of the black signal insertion period.

2. The active matrix type liquid crystal display device as set forth in claim 1, wherein when a polarity of a data signal in each of the data signal lines is inverted, the black signal insertion device arranges the voltage for each of the data signal lines to be the voltage corresponding to the black display only in a predetermined black signal insertion period.

3. The active matrix type liquid crystal display device as set forth in claim 1, wherein the unchanged-storage-capacitor-phase-keeping device includes a storage device configured to record a plurality of values each corresponding to the black signal insertion period and the start timings for the black signal insertion period, the start timings corresponding to the plurality of values, and wherein the unchanged-storage-capacitor-phase-keeping device specifies, with reference to the storage device, the start timing of the black signal insertion period corresponding to the black signal insertion period after the change of the black signal insertion period in a case where the black signal insertion period is changed by the black insertion ratio change device.

4. The active matrix type liquid crystal display device as set forth in claim 3, wherein the storage device comprises a lookup table.

5. An active matrix type liquid crystal display device including: scanning signal lines; data signal lines; a pixel at each intersection of the scanning signal lines and the data signal lines, the pixel including a plurality of sub-pixels; a first storage capacitor line forming a capacitor between the first storage capacitor line and a first sub-pixel electrode in at least one of the plurality of sub-pixels; and a second storage capacitor line forming a capacitor between the second storage capacitor line and a second sub-pixel electrode in at least another one of the plurality of sub-pixels, to which first storage capacitor line and second storage capacitor line signal voltages of phases opposite to each other are applied, respectively, the active matrix type liquid crystal display device comprising:

a black signal insertion device to apply a voltage corresponding to a black display as a voltage for each of the data signal lines as a black insertion pulse at a start timing of a black signal insertion period that is a part of one frame period;

a black insertion ratio change device to change a total length of the black signal insertion period by changing a timing of the black insertion pulse; and an unchanged-storage-capacitor-phase-keeping device to control the black signal insertion period, at a time when the black signal insertion period is changed, so that:

(i) a time from a position in which a signal voltage of the first storage capacitor line or the second storage capacitor line rises to a position in which a first black insertion pulse rises in the black signal insertion period before the change of the black signal insertion period becomes equal to (ii) the time from the position in which the signal voltage of the first storage capacitor line or the second storage capacitor line rises to a position in which the first black insertion pulse rises in the black signal insertion period after the change of the black signal insertion period;

wherein the unchanged-storage-capacitor-phase-keeping device includes a storage device configured to record a plurality of output timings, each corresponding to the black signal insertion period, for carrying out a control such that a phase with respect to the signal voltage of the first storage capacitor line or the second storage capacitor line in the black signal insertion period before the change of the black signal insertion period is not different from the phase with respect to the signal voltage of the first storage capacitor line or the second storage capacitor line in the black signal insertion period after the change of the black signal insertion period.

6. The active matrix type liquid crystal display device as set forth in claim 5, wherein when a polarity of a data signal in each of the data signal lines is inverted, the black signal insertion device arranges the voltage for each of the data signal lines to be the voltage corresponding to the black display only in a predetermined black signal insertion period.

7. An active matrix type liquid crystal display device including: scanning signal lines; data signal lines; a pixel at each intersection of the scanning signal lines and the data signal lines, the pixel including a plurality of sub-pixels; a first storage capacitor line forming a capacitor between the first storage capacitor line and a first sub-pixel electrode in at least one of the plurality of sub-pixels; and a second storage capacitor line forming a capacitor between the second storage capacitor line and a second sub-pixel electrode in at least another one of the plurality of sub-pixels, to which first storage capacitor line and second storage capacitor line signal voltages of phases opposite to each other are applied, respectively, the active matrix type liquid crystal display device comprising:

a black signal insertion device to apply a voltage corresponding to a black display as a voltage for each of the data signal lines as a black insertion pulse at a start timing of a black signal insertion period that is a part of one frame period;

a black insertion ratio change device to change a total length of the black signal insertion period by changing a timing of the black insertion pulse; and an unchanged-storage-capacitor-phase-keeping device to control the black signal insertion period, at a time when the black signal insertion period is changed, so that:

(i) a time from a position in which a signal voltage of the first storage capacitor line or the second storage capacitor line falls to a position in which a first black insertion pulse rises in the black signal insertion period before the change of the black signal insertion period becomes equal to (ii) the time from the position in which signal voltage of the first storage capacitor line or the second storage capacitor line falls to a position in which the first black insertion pulse rises in the black signal insertion period after the change of the black signal insertion period;

wherein the unchanged-storage-capacitor-phase-keeping device includes a storage device configured to record a plurality of output timings, each corresponding to the black signal insertion period, for carrying out a control such that a phase with respect to the signal voltage of the first storage capacitor line or the second storage capacitor line in the black signal insertion period before the change of the black signal insertion period is not different from the phase with respect to the signal voltage of the first storage capacitor line or the second storage capacitor line in the black signal insertion period after the change of the black signal insertion period.

8. The active matrix type liquid crystal display device as set forth in claim 7, wherein when a polarity of a data signal in each of the data signal lines is inverted, the black signal insertion device arranges the voltage for each of the data signal lines to be the voltage corresponding to the black display only in a predetermined black signal insertion period.

9. An active matrix type liquid crystal display device including: scanning signal lines; data signal lines; a pixel at each intersection of the scanning signal lines and the data signal lines, the pixel including plurality sub-pixels; a first storage capacitor line forming a first capacitor between the first storage capacitor line and a first sub-pixel electrode in at least one of the plurality of sub-pixels; and a second storage capacitor line forming a second capacitor between the second storage capacitor line and a second sub-pixel electrode in at least another one of the plurality of sub-pixels, to which first storage capacitor line and second storage capacitor line signal voltages of phases opposite to each other are periodically applied, respectively, the active matrix type liquid crystal display device comprising:

a black signal insertion device to apply a voltage corresponding to a black display as a voltage for each of the data signal lines as a black insertion pulse at a start timing of a black signal insertion period that is a part of one frame period;

a black insertion ratio change device to change a total length of the black signal insertion period by changing a timing of the black insertion pulse; and an unchanged-storage-capacitor-phase-keeping device to control the black signal insertion period, so that a time difference, before the change of the black signal insertion period, between:

(i) a timing, among timings at which signal voltages of the first or second storage capacitor line rise, at which a storage capacitor voltage rises that is both prior to the start timing of the black signal insertion period and a closest timing to the start timing of the black signal insertion period, and (ii) the start timing of the black signal insertion period; becomes the same as the time difference, after the change of the black signal insertion period, between:

(iii) the timing, among the timings at which the signal voltages of the first or second storage capacitor line rise, at which the storage capacitor voltage rises that is both prior to the start timing of the black signal insertion period and the closest timing to the start timing of the black signal insertion period, and (iv) the start timing of the black signal insertion period; wherein the unchanged-storage-capacitor-phase-keeping device includes a storage device configured to record a plurality of output timings, each corresponding to the black signal insertion period, for carrying out a control such that a phase with respect to the signal voltage of the first storage capacitor line or the second storage capacitor line in the black signal insertion period before the change of the black signal insertion period is not different from the phase with respect to the signal voltage of the first storage capacitor line or the second storage capacitor line in the black signal insertion period after the change of the black signal insertion period.

10. The active matrix type liquid crystal display device as set forth in claim 9, wherein the storage device comprises a lookup table.

11. The active matrix type liquid crystal display device as set forth in claim 9, wherein when a polarity of a data signal in each of the data signal lines is inverted, the black signal insertion device arranges the voltage for each of the data signal lines to be the voltage corresponding to the black display only in a predetermined black signal insertion period.

* * * * *